United States Patent
Potlapally et al.

(10) Patent No.: US 9,819,727 B2
(45) Date of Patent: Nov. 14, 2017

(54) COMPUTING INFRASTRUCTURE FOR CONFIGURABLE-QUALITY RANDOM DATA

(71) Applicant: Amazon Technologies, Inc., Reno, NV (US)

(72) Inventors: Nachiketh Rao Potlapally, Arlington, VA (US); Andrew Paul Mikulski, Fairfax, VA (US); Donald Lee Bailey, Jr., Penn Laird, VA (US); Robert Eric Fitzgerald, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 552 days.

(21) Appl. No.: 13/781,289

(22) Filed: Feb. 28, 2013

(65) Prior Publication Data

US 2014/0244785 A1 Aug. 28, 2014

(51) Int. Cl.
| | |
|---|---|
| *G06F 15/16* | (2006.01) |
| *H04L 29/08* | (2006.01) |
| *H04L 9/08* | (2006.01) |
| *H04L 29/06* | (2006.01) |
| *H04L 9/06* | (2006.01) |

(52) U.S. Cl.
CPC ............ *H04L 67/10* (2013.01); *H04L 9/0662* (2013.01); *H04L 9/0869* (2013.01); *H04L 63/20* (2013.01); *H04L 67/1023* (2013.01)

(58) Field of Classification Search
CPC .................................................. H04L 9/0869
USPC .......................................................... 709/217
See application file for complete search history.

(56) References Cited

U.S. PATENT DOCUMENTS

| | | |
|---|---|---|
| 5,732,138 A | 3/1998 | Noll et al. |
| 6,195,669 B1 | 2/2001 | Onodera et al. |
| 6,253,223 B1 | 6/2001 | Sprunk |
| 6,628,786 B1 | 9/2003 | Dole |
| 6,862,605 B2 | 3/2005 | Wilber |
| 6,947,960 B2 | 9/2005 | Hars |

(Continued)

FOREIGN PATENT DOCUMENTS

| | | |
|---|---|---|
| JP | H08320780 | 12/1996 |
| JP | H11249872 | 9/1999 |
| WO | 2007/033087 | 3/2007 |

OTHER PUBLICATIONS

Elaine Barker, John Kelsey "Recommendation for Random Number Generation Using Deterministic Random Bit Generators" NIST Special Publication 800-90A Jan. 2012 pp. 1-136.

(Continued)

*Primary Examiner* — Kevin Mai

(74) *Attorney, Agent, or Firm* — Robert C. Kowert; Meyertons, Hood, Kivlin, Kowert & Goetzel, P.C.

(57) ABSTRACT

Methods and apparatus for a computing infrastructure for configurable-quality random data are disclosed. A storage medium stores program instructions that when executed on a processor designate some servers of a provider network as members of a pool of producers of random data usable by random data consumers. The instructions, when executed, determine a subset of the pool to be used to supply a collection of random data intended for a random data consumer, and one or more sources of random phenomena to be used to generate the collection of random data. The instructions, when executed, initiate a transmission of the collection of random data directed to the random data consumer.

28 Claims, 17 Drawing Sheets

(56) References Cited

U.S. PATENT DOCUMENTS

| | | | |
|---|---|---|---|
| 7,269,614 | B2 | 9/2007 | Wells et al. |
| 7,516,169 | B2 | 4/2009 | Collier |
| 7,930,332 | B2 | 4/2011 | Acar et al. |
| 8,015,224 | B1 | 9/2011 | Chaichanavong et al. |
| 2004/0248549 | A1 | 12/2004 | Drews |
| 2006/0072747 | A1* | 4/2006 | Wood et al. ............... 380/44 |
| 2007/0189534 | A1 | 8/2007 | Wood et al. |
| 2007/0230694 | A1 | 10/2007 | Rose et al. |
| 2009/0144351 | A1* | 6/2009 | Rueping ............... G06F 7/58 708/255 |
| 2010/0240440 | A1 | 9/2010 | Szrek et al. |
| 2011/0047545 | A1* | 2/2011 | Ellison et al. ............... 718/1 |
| 2012/0221615 | A1 | 8/2012 | Cerf et al. |
| 2013/0136255 | A1* | 5/2013 | Brown ............... H04L 9/0869 380/28 |

OTHER PUBLICATIONS

"What's This Fuss About True Randomness" RANDOM.org, downloaded Dec. 11, 2012 pp. 1-3.

Elaine Barker, John Kelsey "Recommendation for Random Bit Generator (RBG) Constructions" DRAFT NIST Special Publication 800-90C Aug. 2012, pp. 1-50.

Elaine Barker, John Kelsey "Recommendation for the Entropy Sources Used for Random Bit Generation" NIST DRAFT Special Publication 800-90B Aug. 2012, pp. 1-78.

U.S. Appl. No. 13/781,298, filed Feb. 28, 2013, Nachiketh Rao Potlapally et al.

U.S. Appl. No. 14/737,471, filed Jun. 11, 2015, Gregory Alan Rubin et al.

Office Action from Canadian Application No. 2,903,175, dated Sep. 26, 2016, Amazon Technologies, Inc., pp. 1-3.

Office Action from Japanese Application No. 2015-560350, dated Sep. 6, 2016, Amazon Technologies, Inc., pp. 1-7.

"HTTP Interface Description", Retrieved from URL: https://web.archive.org/web/20130116085346/http://www.random.org/clients/http, Jan. 16, 2016, pp . 1-6.

"Gussian Random Number Generator", Retrieved from URL: https://web.archive.org/web/20130116085629/http://www.random.org/clients/http, Jan. 16, 2013, pp. 1-7.

Extended European Search Report from Application No. 14756576.6, dated Sep. 7, 2016, Amazon Technologies, Inc., pp. 1-7.

Notice of Preliminary Rejection from Korean Application No. 10-2015-7026361, dated Aug. 18, 2016, Amazon Technologies, Inc., pp. 1-9.

\* cited by examiner

900

Random Data Service Settings Page https://<website>.com/randSettings

Dear John Doe,
Thanks for selecting the Random Data Service. ← 903

Please select the settings you would like for your random data delivery options.

| | | |
|---|---|---|
| Client ID to be billed: | 3218938492 (John Doe, Seattle, WA) | ← 905  ← 971 |
| Destination hosts, delivery mode: | (Default) All my compute instances/pull-mode only (click here to change) | ← 907 |
| Random-number consuming applications: | (Default) All my applications (click here to change) | ← 909 |
| Random number quality: | (Default) Choose based on type of application (click here to change) | ← 911 |
| Security protocol: | (Default) Use protocol for trusted hosts (click here to change) | ← 913 |
| Uniqueness requirements: | (Default) None (click here to change) | ← 915 |
| Pricing policy: | (Default) US$ 0.10 for up to 1,000,000 random bits per day (click here to change) | ← 917 |
| Notification policy: | (Default) Notify me via-email if I exceed 100,000,000 bits per day (click here to change) | ← 919 |

For additional customization (e.g., to specify application-specific preferences), click here. ← 921

[ Apply ] ← 990

COMPUTING INFRASTRUCTURE FOR CONFIGURABLE-QUALITY RANDOM DATA

BACKGROUND

Numerous types of computing applications and protocols rely on the use of random data. For example, random numbers may be used for generating cryptographic keys or certificates that used in large numbers of transactions carried out over public and/or private networks. Such cryptographic keys and certificates are the basis of the trust placed in security algorithms by millions of end users and service providers, and are fundamental for providing data confidentiality, authentication and integrity. The vast majority of Internet-based services, which may cumulatively result in billions of dollars of business revenue annually, rely on the use of random data to implement some of the core infrastructure technologies used for those services. Government agencies such as revenue collection services and/or research establishments also utilize security algorithms dependent upon random data for critical operations.

The extent to which the applications and systems using the random data are truly secure may depend upon the quality of the random data. For example, malicious attackers may be able to penetrate the security more easily if the quality of the random numbers being used is poor (e.g., if there is a predictable correlation between different random numbers being used in a given security algorithm). The problem of poor random number quality may be exacerbated in certain types of environments, in which for example a small number of sources of physical phenomena assumed to be random are used to generate random data for use by multiple applications. At the same time, not all applications that use random data may require the data to have the same statistical qualities, and in such mixed-application scenarios, the costs of generating large amounts of high quality random data may have to be weighed against the benefits.

BRIEF DESCRIPTION OF DRAWINGS

FIG. 9 illustrates an example web-based interface enabling a client of a random data service to specify properties of random data to be provided, according to at least some embodiments.

Figure 1:
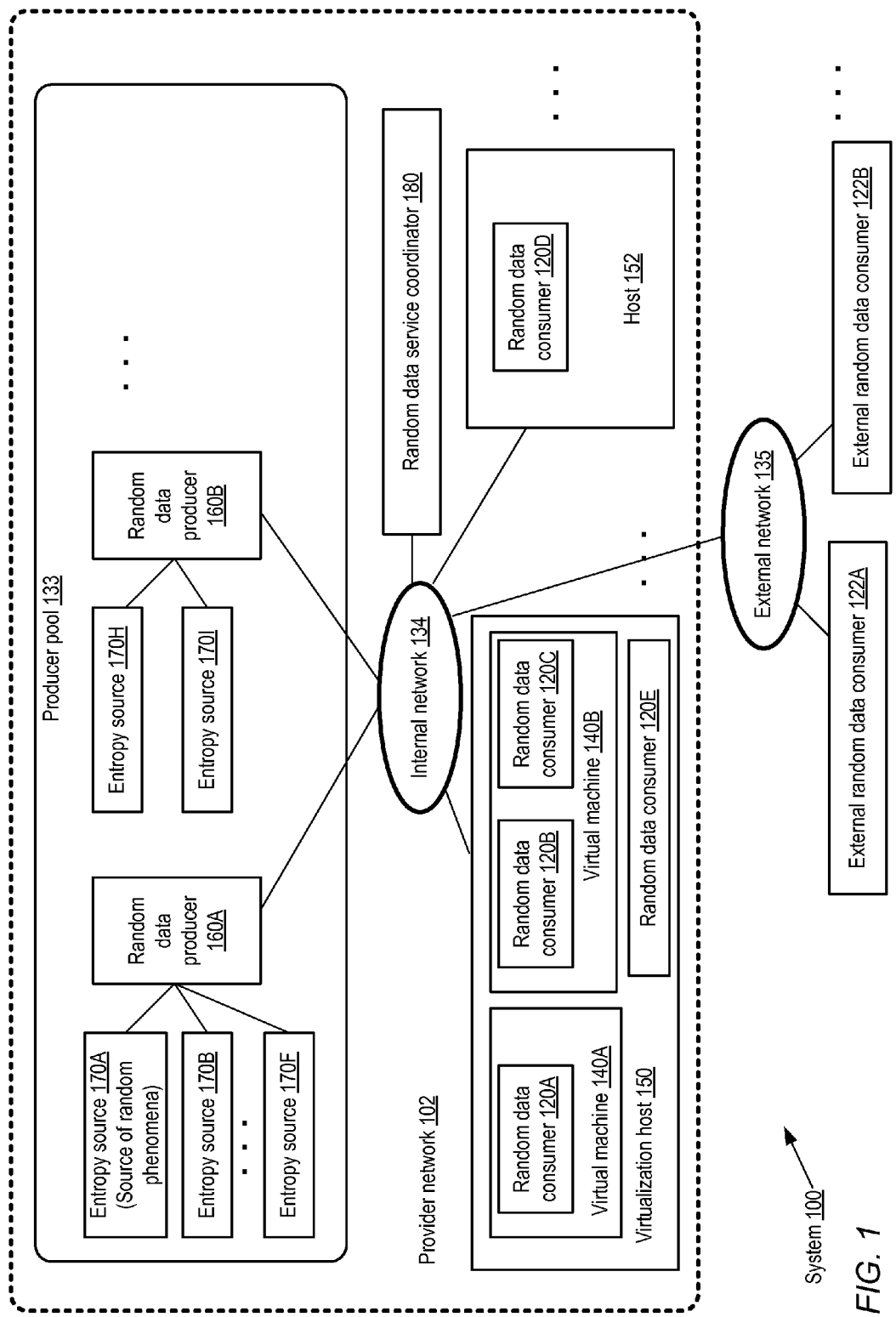
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a network-accessible service designed to provide selectable-quality random data to a plurality of random data consumers or clients are described. Networks set up by an entity such as a company or a public sector organization to provide one or more services (such as various types of cloud-based computing or storage services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A number of different hardware and/or software components, some of which may be instantiated or executed at different data centers or in different geographical regions, may collectively be used to implement the underlying infrastructure supporting the random data service in various embodiments. Several different types of random data consumers, such as components of virtualization software, operating system software, user-level applications, and/or software implementing other services of the provider network, may be able to obtain random data of desired quality from the service in different environments, using secure communication protocols whose properties may also be selectable or customizable. In some embodiments the random data produced by the service may be fed into, or combined with, a pool or buffer of random data (which may be referred to as the "primary entropy pool") that is typically set up at hosts of the provider network. The primary entropy pool at a given host, which may also include random data generated locally at the host as described below, may be used by pre-existing entropy extraction software (e.g., in a hypervisor layer at the host) to support various programming interfaces (e.g., operating system or library application programming interfaces (APIs) used by various end-user applications) requiring random numbers. In at least some embodiments, the service-provided random data may be employed in such a way (e.g., by using the service-provided random data to schedule a sequence of signals emulating keyboard or other hardware interrupts that are typical local sources of random phenomena used for the primary entropy pool) that, without requiring any software changes in the application layer or in the operating system layer, the built-in mechanisms present in various layers of the software stack for random number support may automatically generate random data of a higher quality than could have been obtained in the absence of the service. Further details regarding the manner in which service-provided random data may be distributed, combined and used, and the types of interfaces that may be used for various aspects of the service in different embodiments, are provided below.

According to one embodiment, a system for implementing the service may comprise one or more computing devices configured to designate one or more servers of the provider network as members of a pool of producers of random data (such as random bit-sequences that may in turn be used as seeds for random number generation). The computing devices may determine, for various servers of the pool, a respective set of candidate sources of random phenomena (such as thermal noise or radioactive decay). The servers of the pool may be configurable to generate random data based at least in part on a digitized representation of random phenomena from the candidate sources. The sources of random phenomena may also be referred to herein as "entropy sources". Any combination of a number of different types of entropy sources may be used in different embodiments, including, for example, in addition to the sources of thermal noise or radioactive decay mentioned above, sources of electronic noise or shot noise, electromagnetic radiation sources, entities undergoing detectable quantum-mechanical changes, clock drifts, movements of disk read/write heads, sources of radio noise, weather changes, atmospheric phenomena such as cosmic rays, the timing of sequences of interrupts such as keyboard entry interrupts or mouse interrupts, changing visual data collected through a video camera lens over time, and the like. In some implementations, the manufacturers of one or more chipsets used in the provider network (e.g., as central processing units or as peripherals on various hosts) may expose APIs allowing the extraction of random data based on electronic noise or other signals. In one implementation, an entropy source may be incorporated into a small peripheral device (e.g., a "dongle") attachable to a producer server via a universal serial bus (USB) connection or some other standard or custom connectivity mechanism. In some embodiments, some of the entropy sources may natively produce digital output, while others may natively produce analog output which may have to be converted to digital form. Different members of the producer pool may be configured with different entropy sources in some embodiments, while in other embodiments, each of the pool members may be configured with the same entropy sources. In addition, different sets of entropy sources may be used by the same random data producer to provide random data for respective consumer interactions in at least some embodiments. The quality of the random data generated (e.g., how random the data produced actually is, which may be measurable using statistical tests) may at least in some cases depend on the number and nature of entropy sources used.

In at least some embodiments, the computing devices implementing the service may be configured to determine, on behalf of a particular random data consumer, (a) a subset of the pool of producers to be used to supply a collection of random data such as a bit-sequence of a specified length (b) one or more entropy sources from among the available candidates to be used to generate the collection of random data at the selected producers, and/or (c) one or more delivery or service parameters to be used to transmit the collection of random data to the random data consumer. A number of different approaches or algorithms may be used to select the producers and the entropy sources in different embodiments, as described below in further detail, such as selection based on source preferences or quality requirements explicitly specified on behalf of the consumer, selection based on inferred characteristics or needs of the consumer's applications, and so on. The parameters determined may include, for example, the size or amount of the random data to be transmitted at one time on behalf of the consumer, the rate or frequency at which random data is to be transmitted (in scenarios when the random data is to be provided multiple times, or streamed, to a given consumer), whether the data is to be transmitted only in response to specific requests (e.g., in a "pull" model of random data acquisition) or whether the data is to be transmitted independently of specific requests (e.g., using a "push" model), and/or the security protocols to be used for the transmission. In at least one embodiment the parameters may also include an indication (such as a network address) of a destination to which the random data is to be sent by the service on behalf of the consumer.

In at least some embodiments, a given business entity or user with a client account or billing account established with the provider network may have several different types of random-data-consuming applications. Decisions regarding which specific entropy sources and/or which specific producers of the pool are to be used for a given consumer or client may be made at several different granularities in different embodiments. For example, in scenarios in which a pull model is being used, so that sets of random data are supplied in response to respective distinct requests, some of the choices regarding producers and/or sources may be made at the request level (e.g., if a consumer submits two requests R1 and R2 for random data, a different set of entropy sources and/or producers may be used, at least in principle, for R1 than is used for R2) in one embodiment. Source choices may also be applied at the granularity of multiple requests/responses, for all requests over certain time periods, for all requests associated with a particular consumer process, or for all requests associated with a particular billing account or client account in some embodiments. Similarly, in scenarios in which a push model is used, choices regarding sources may also be made either per transmission, or for multiple transmissions, based on time periods, or based on accounts, in various embodiments. The set of communications between the service and a consumer, associated with a single transmission of random data from the service, may collectively be referred to herein as a "random data interaction" or simply as an interaction. In the case of a pull model, an interaction may include a request for random data and a response to the request, for example, while in the case of a push model, an interaction may comprise a transmission of random data but may not include a request.

Having determined the specific set of producers, the specific types of sources of random phenomena to be employed at or by the selected producers, and the parameters, the computing devices may initiate a transmission of the collection of random data directed to the destination associated with the random data consumer in accordance with the parameters. In some implementations, as described below, the destination may comprise an intermediary that may be configured to combine random data from additional sources, while in other implementations, the destination may be the consumer itself.

In some embodiments, an indication of desired statistical qualities of the random data needed or requested by a particular consumer may be available to the service, and such indications may be used to select the producers and/or the specific entropy sources to use. The indications may be expressed subjectively by clients of the service in some embodiments (e.g., a client may choose among random numbers of "high", "medium" or "low" quality in some implementations), while in other implementations more precise and/or objective metrics may be provided by the clients, such as a requirement to meet a particular published standard of random data quality, or a desired mathematical property that the data should possess. In some embodiments the quality of random data may be indicated (either by clients or by the service itself) by referring to academic or government-issued publications that provide analyses, rankings or metrics of the randomness of data acquired from various types of entropy sources. For example, if a respected academic publishes a study that reports that entropy sources using cosmic ray phenomena provide random data with high quality, while entropy sources using hard drive read/write head movements provide random data with lower quality, this may help clients of the random data service decide which types of entropy sources they may wish to use, and may also help the service to characterize its entropy sources appropriately. In at least one embodiment, the service may be able to infer the requirements of random data quality, and the appropriate types of entropy sources to be used, based on identifying or deducing the kind of applications for which the random data is going to be employed—for example, cryptographic applications may be deemed to need higher quality random numbers than a low-end video game application. Inferences about the characteristics of random data to be provided may also be made based on other attributes of the consumers or the requests from the consumers in some embodiments, such as the network addresses to which the data is to be delivered (which may indicate whether they are internal or external to the provider network), or the quantities or rates at which the data is requested or consumed.

In one embodiment, the random number service may be designed to comply with one or more uniqueness policies. For example, the provider network may implement a virtualized compute service, such that multiple virtual machines (which may be termed "guest" virtual machines or guest VMs) may be implemented at the same physical host on behalf of clients. In some cases different VMs on the same host may use the same "machine image" for startup. Applications running on different guest VMs at the same host may require respective statistically distinct random data sets. The service may be configured in some embodiments to ensure that the random data provided to a random data consumer at any one guest VM is statistically independent (or unique) with respect to the random data provided to a different consumer at any other guest VM. Uniqueness requirements may apply to sets of random data provided to the same consumer at different times, across different consumers at the same guest VM, and/or across different virtual machines in various embodiments. Approaches to implementing desired levels of uniqueness are described below in further detail, e.g., in conjunction with the description of FIG. 7. Clients of the service may be enabled to customize or select among different uniqueness policies for their random data in some embodiments, and the service may be responsible for coordinating the generation and transmission of respective collections of random data to a plurality of consumer applications in accordance with the selected or customized uniqueness policies.

As mentioned earlier, the destination to which the collection of random data is provided by the service may comprise an intermediary such as a local random data aggregator running on the same host as the random data consumer in some embodiments. Such an intermediary may be configured to combine the random data being provided by the service with locally-generated random data before providing a result of the combination to the consumer in such embodiments. Thus, the intermediary may server as a logical abstraction layer between a plurality of entropy sources and the software components that need the random data on the host. Such intermediaries may be termed "entropy extractors" or "entropy smoothers" in some implementations. The locally-generated random data may be produced at the host using one or more local entropy sources (such as local keyboard interrupt streams, or local sources of thermal noise) in some embodiments. Various aggregation policies may be used to combine the service-provided random data with the locally-generated random data in different embodiments: e.g., a service-provided random bit-sequence may simply be appended to, prepended to, or inserted into a locally-generated random bit-sequence in some implementations, while in another implementation more complex mathematical functions may be used to combine the two sets of random data. In one simple implementation, a buffer of random data may be maintained, and new random data received from a given source (such as the service, or a local random data generator) may simply be added to the buffer in the order received, with the buffer being reused (by overwriting the old random data with new random data) when it gets full. In the cases where the service-provided data is included in a sequence of locally-generated random values, (e.g., by appending, prepending, or inserting portions or all of the service-generated random data) the result of the combination may simply be considered a larger set of locally-generated random data, thus minimizing or eliminating the need for changes in the software that consumes the random data combined by the intermediary. In some implementations the locally-generated random data may be of poorer quality than the service-generated random data, such that combining the two sets of random data would have the effect of enhancing the quality of the random data that the consumer ultimately receives, compared to a scenario in which only the locally-generated random data were available. The combination of locally-generated data and service-provided data may also have the beneficial side effect that the data actually received by the consumer would differ from the data generated by the service, such that even if the service was successfully attacked or temporarily controlled by a malicious entity, the malicious entity would not be able to determine exactly what random data is delivered to the consumer, and thus the probability of breaching the consumer application's security would be lessened.

In some embodiments, the intermediary or local random data aggregator may be incorporated within virtualization software such as a hypervisor running on the host, and/or within operating system software running on the host. In one embodiment, a daemon or system process at the virtualization software layer or the operating system layer may act as the intermediary or aggregator, e.g., by intercepting requests (such as API calls) for random data from higher-level software components or applications, and providing the results of the combination of service-generated and locally-generated random data. In at least one embodiment, the intermediary may be configured to determine whether a particular random data consumer, or a particular random data consumer interaction, should be fulfilled using service-provided random data, or whether locally-generated random data would suffice. In such an embodiment, the combination of the service-provided data with the locally-generated data would be performed only for those consumers or interactions that require the higher-quality service-provided random data, while lower-quality random data needs may be fulfilled without utilizing the service-provided data. Depending on the pricing policies in use for the random data service, such a flexible approach may reduce client billing costs for random data in some embodiments. In at least one embodiment, the intermediary may determine to use only the service-provided random data, instead of combining it with locally-generated random data, for at least some consumer interactions. In one embodiment, the random data generated by the service may be provided to the consumer without the use of an intermediary or local aggregator.

According to one embodiment, the size of the pool of random number producers, and/or the distribution of the producers among different locations of the provider network, may be determined based on estimates of expected random data usage and/or based on availability, redundancy, or resiliency requirements for the service. For example, the physical resources (such as various types of servers, storage and networking equipment) of the provider network may be distributed across numerous data centers, spanning multiple cities, geographical regions or countries. The provider network may also be organized into availability containers engineered in such a way that failures (such as power outages or network outages) are not expected to be correlated across multiple availability containers in some embodiments, so that the resources within a given availability container are expected (with a very high probability) to be unaffected by failures in other availability containers. A given availability container may comprise portions or all of one or more data center in some embodiments.

To help determine the appropriate size of the producer pool, a number of metrics and/or estimates may be obtained. The rate at which random data is consumed by a plurality of consumers may be determined, e.g., over some selected period of time such as a month. The random data generating capacity of a given type of server to be included in the pool of random data producers may be determined or measured, e.g., in units such as random bits produced per second for a given CPU utilization level at the server. The anticipated or expected number of consumers of random data (e.g., for some future period such as the next six months) to be handled by the service may also be determined. A baseline number of producer pool servers may be estimated, e.g., using the rate of consumption, the capacity of a given server, and the predicted number of consumers in one embodiment. The redundancy and/or availability needs of the random number service may be taken into account to adjust the baseline value to determine the number of servers to be designated as members of the pool, and the specific data centers and/or availability containers into which the servers should be distributed in some embodiments. A placement plan mapping the servers to availability containers or data centers may be generated in some embodiments, for example taking into account networking latencies for data transmission between the availability containers or data centers. Surplus producer servers (beyond the numbers determined based on expected rates of random data consumption and availability/redundancy needs) may also be deployed to handle bursts of random data requests in some implementations. A fleet of random data producers may be deployed based on some combination of the above approaches, and the utilization levels of the producers as well as other performance characteristics may be tracked over time, adjusting the fleet size and/or the locations of the producers as needed.

In some embodiments, the service may select the subset of the producer pool (or pools) to be used for a given consumer using a random selection policy. As a result, different sets of producer servers may be utilized for different collections of random data provided to a given consumer or to different consumers in such embodiments, thus potentially further enhancing the statistical independence between the collections. In other embodiments, the same set of producer servers may be used repeatedly for a given random data consumer. In some embodiments, a failover relationship may be established between producer servers, such that if a particular producer P1 becomes temporarily or permanently unavailable, a different producer P2 that has been designated as a standby or backup producer for P1 may be used.

In one embodiment where a plurality of producer servers is to be used for the random data to be supplied to a given consumer, the service may include an aggregating server configured to combine the respective random data sets from each of the producers before transmitting a result of the combination to the destination associated with the consumer. The aggregating server (which may be one of the producer servers involved in generating the random data, or may be a separate server designated primarily for aggregating the data from producers) may use a number of techniques to combine the data from the multiple producers in different embodiments, for example using straightforward appending, prepending, insertion, or other mathematical approaches. In other embodiments, such a service data aggregator may not be used, so that even in scenarios in which multiple producers' random data is to be provided to a single consumer, the sets of random data may be transmitted independently, without service-side aggregation, to the consumer.

Numerous types of random data consumers may be able to utilize the service in various embodiments. Example consumers may include cryptography applications, security certificate generators, gambling applications, video game applications, authorization applications configured to generate tokens based at least in part on random data, applications configured to use sequence numbers (e.g., for network packets), other service providers within the provider network (e.g., components of the provider network that implement virtualized storage or database services), entropy extracting software components or entropy smoothing components configured to obtain random numbers from a primary entropy pool at a host, operating system components or daemons configured to support a library comprising one or more random number routines, or virtualization software components configured to provide random data to one or more guest virtual machines. In at least one embodiment, random data provided by the service may be used as seeds for random number generation routines.

In at least some embodiments, random number consumer applications may run either within the provider network in which the service is implemented, or outside the provider network. In one such embodiment, several different security protocols may be implemented by or at the service, providing respective levels of confidentiality, data integrity, authenticity, and/or replay protection (the prevention of replay attacks in which valid data transmissions may be maliciously or fraudulently repeated or delayed). Industry-standard security mechanisms such as secure sockets layer (SSL) protocol may be used in at least some of the protocols, and such mechanisms may inherently provide desired levels of the various security attributes listed above. Some consumers, executing on hosts within the provider network, may be deemed "trusted" consumers, and/or the hosts on which these consumers run may be deemed "trusted" hosts. A security protocol appropriate for trusted hosts or trusted consumers may be used, at least by default, for such consumers. A different security protocol (e.g., one involving a higher level of encryption, digital signatures or the like) may be used, at least by default, for untrusted consumers or untrusted hosts. In some embodiments the security protocol to be used may be configurable or selectable by the clients of the service. In one embodiment, the service may infer the type of security protocol to be used for a given client or consumer, e.g., based on the type of application that is to consume the random data, and/or based on the network address of the consumer.

In some embodiments, one or more programmatic interfaces (such as APIs, web pages, other graphical user interfaces, or command line tools) may be implemented to support various aspects of the service. Some such programmatic interfaces may be for configuration or control, e.g., interfaces enabling clients to specify desired characteristics of random data to be provided, to select security protocols, pricing policies and the like. Other programmatic interfaces may be implemented for the transmission of the random data itself—e.g., to receive requests for random data and to respond to the requests, or to provide the data in the absence of explicit requests if a "push" mode of delivery is being used.

System Providing Random Data Service

FIG. 1 illustrates an example system environment, according to at least some embodiments. As shown, system 100 may include a provider network 102 set up to support a plurality of services for internal and external clients, including a random data service. The provider network 102 may include a variety of physical and logical resources distributed across one or more data centers. Random data service coordinator 180, which may be referred to herein simply as the coordinator 180, may comprise a collection of resources responsible for managing and implementing the generation and delivery of random data to a variety of random data consumers, including for example consumers 120 (e.g., 120A, 120B, 120C, 120D and 120E) within the provider network as well as external random data consumers 122 (e.g., 122A and 122B). External and internal random data consumers 122 and 120 respectively may collectively be referred to herein as consumers or clients. As shown, the provider network 102 may include one or more pools 133 of random data producers 160 (which may be referred to herein simply as producers), such as producers 160A and 160B, with each pool including one or more servers designated to produce random data for use by the consumers 120 and/or 122. The producers 160 may each be configurable to utilize digitized representations of random phenomena that occur at a respective set of entropy sources 170 to generate random data for use by the consumers—e.g., producer 160A may use entropy sources 170A-170F, while producer 160B may use entropy sources 170H and 170I in the depicted example. Further details regarding entropy sources and their use are provided below in conjunction with the description of FIG. 2 It is noted that although the coordinator 180 is illustrated as a single entity in FIG. 1, in various embodiments the coordinator may comprise a plurality of hardware and/or software components, at least some of which may be distributed across multiple computing devices and/or across multiple data centers of the provider network. In some implementations components of the coordinator may be resident at the random data producers 160, at some hosts (e.g., host 150 or host 152) at which the random data is consumed, and/or at other devices not shown separately in FIG. 1, such as devices of the provider network that may be designated as service data aggregators (as shown in FIG. 3 and described below in further detail).

The coordinator 180 may be responsible for managing producer pool membership in some embodiments, e.g., by determining how many (and which) servers of the provider network are to designated as producers 160, deploying the servers as random data producers, adding and removing pool members as needed based on the expected and/or measured random data consumption rates. In some such embodiments, the coordinator 180 may determine candidate entropy sources 170 that may be used by one or more of the producers for random data generation—e.g., the coordinator 180 may direct a producer 160 to start or stop using one or more devices as entropy sources. The coordinator 180 may also control various aspects of the generation, collection and distribution of random data for a given consumer in the depicted embodiment. For example, the coordinator may be configured to determine, on behalf of a particular consumer, the specific set of producers 160 that are to generate random data, and/or the specific entropy sources 170 to be used. Such decisions about sources may be made at different granularities in different embodiments—for example, different producers and/or entropy sources may be selected for a given consumer on a per transfer basis, or for all random data to be provided during a selected time interval, or for all random data to be provided indefinitely (or until a source configuration change request on behalf of the consumer is received). The choice of sources of random data for a consumer, at the producer level as well as the entropy source level, may be based on various factors, for example based on a determination or inference of the quality or statistical properties of the random data to be provided, on the pricing policy in use for the consumer, on the current state of the workload at (or connectivity to) various producers 160, or on measurements of the statistical properties of the random data previously produced by a given entropy source or by a given producer, in some embodiments. For example, in one implementation, a particular entropy source or a particular producer may be dropped from the set of resources used for one or more consumers if some desired statistical property is no longer being met.

The coordinator 180 may also be responsible for determining several types of service delivery parameters for random data collections to be provided to a consumer in the depicted embodiment. Delivery parameters may include, for example, whether a push policy is to be implemented (in which delivery of random data is initiated by the service according to some delivery schedule or policy, and the service does not have to receive an explicit request to deliver some agreed-upon quantum of random data), whether a pull policy is to be implemented (in which the service provided random data in response to explicit requests for random data), or whether a combined push-and-pull policy is to be used. Other example delivery parameters may govern how much random data is to be provided in one transfer (e.g., the length of a bit string to be provided), how frequently and at what rate random data is to be provided if a push model is used, exactly which network destination, queue, or process is to receive the data, the security protocol to be used, and so forth. Delivery parameters may be explicitly indicated by the consumer (or the provider network client on whose behalf the random data consuming application is run) in some embodiments, or may be inferred by the coordinator 180 based on the particular programmatic interface being used by the consumer, or some other identification of the type of application that is to consume the random data (such as a network address). Having determined the sources and the delivery parameters, the coordinator 180 may initiate transmission of a collection of random data (e.g., as a string or sequence of random binary digits) to a destination associated with the consumer in accordance with the delivery parameters. In at least some embodiments, the coordinator 180 may implement various programmatic interfaces, e.g., for control and configuration interactions with the users of the service and/or for the distribution or delivery of the random data.

As shown in FIG. 1, various types of consumers of random data may utilize the random data provided by the service in the depicted embodiment. Internal consumers 120 may include, for example, applications running on virtual machines 140 (as in the case of consumers 120A, 120B and 120C) instantiated at a virtualization host 150 that may be implemented as part of a multi-tenant virtual compute service supported by the provider network 102. Some internal consumers 120, such as 120E, may represent control or management software running at virtualization hosts, such as hypervisor components and/or operating system components, as opposed to applications running on the virtual machines 140. In addition, the provider network may implement a number of other services, such as storage services, database services, load balancing services, networking services, identity management services, and the like, and another internal consumer (e.g., 120D) of random data may reside on a host 152 implementing a component of one these other services.

Delivery of random data to such internal consumers 120 may be accomplished using an internal network 134 in the depicted embodiment. Delivery of random data to external consumers 122 may involve the use of external network(s) 135, such as portions of the public Internet. Since the provider network 102 may not in general have as much administrative and configuration control over external networks and/or devices as it does over internal network 134 and internal hosts 150 or 152, different security protocols may be implemented for transfer of random data to internal versus external consumers in some embodiments. In some implementations, consumers 120 internal to the provider network may be considered trusted consumers, while external consumers may by default be considered untrusted. A security protocol designed for trusted consumers or trusted internal hosts may be used for internal transmissions of random data, while a different security protocol designed for untrusted consumers and untrusted hosts may be used for external transmissions in some embodiments. As described below in further detail, security protocols may be configurable or customized in at least some embodiments.

Generation and Combination of Random Data

Figure 2:
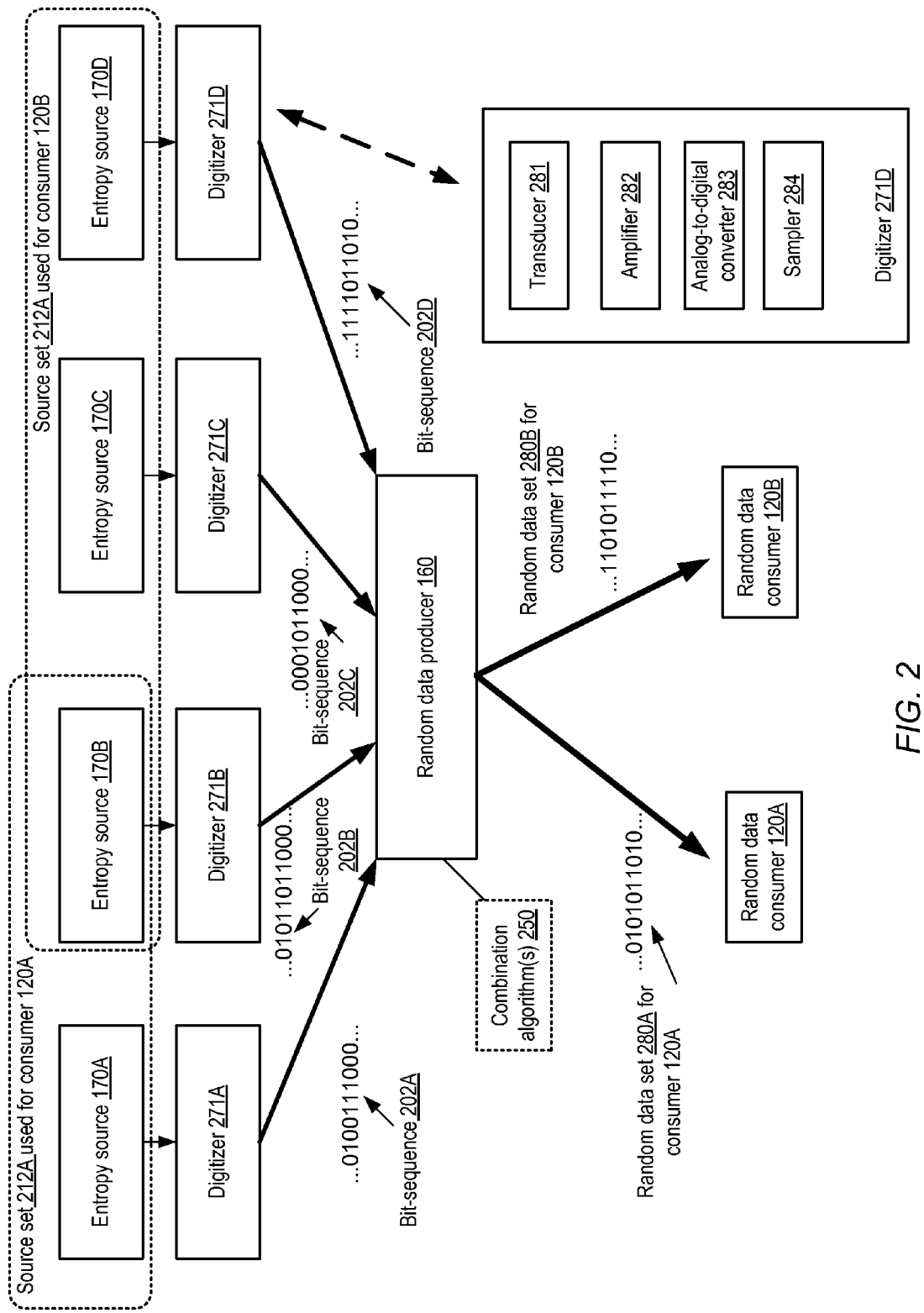
FIG. 2 illustrates a producer configured to utilize a plurality of sources of random phenomena to generate random data, according to at least some embodiments.
Figure 3:
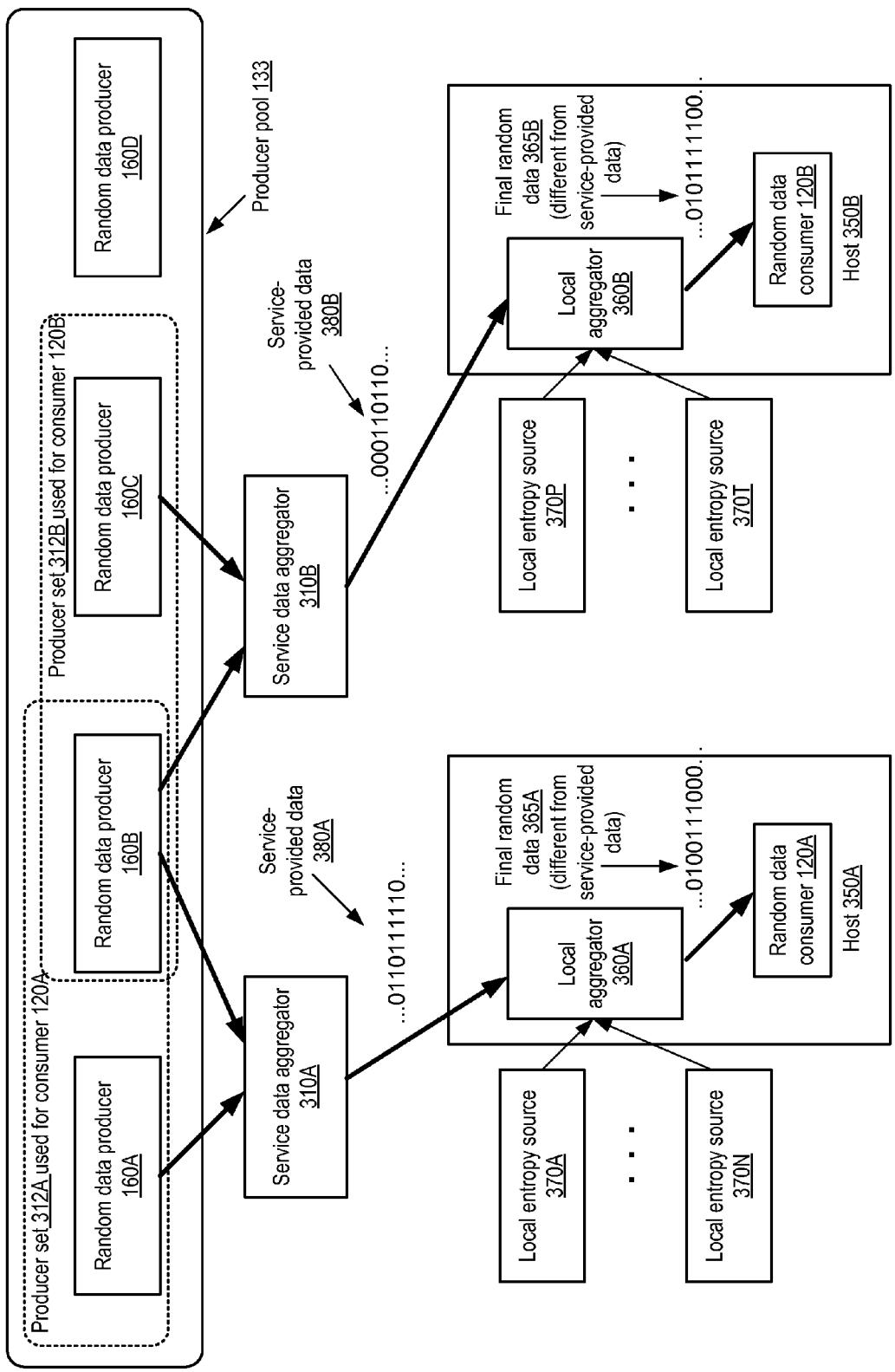
FIG. 3 illustrates aggregation of random data generated by multiple random data producers, according to at least some embodiments.

FIG. 2 illustrates a producer 160 configured to utilize a plurality of sources 170 of random phenomena (also termed entropy sources herein) to generate random data, according to at least some embodiments. Four example entropy sources 170A-170D are shown, each of which generates signals based on some generally unpredictable physical phenomena. A respective digitizer 271 coverts the signals into bit-sequences—e.g., digitizer 271A converts the signals of entropy source 170A into bit-sequence 202A, digitizer 271B converts the signals of entropy source 170B into bit-sequence 202B, and so on. The producer 160 is responsible in the depicted embodiment for receiving the bit-sequences from the digitizers as input, and using the input to generate one or more output sets of random data, e.g., one bit-sequence for each of consumers 120A and 120B in the depicted embodiment.

A number of different types of phenomena may be used to generate random data in various implementations. Some entropy sources 170A may represent naturally-occurring, largely unpredictable events or phenomena, such as changes in weather or atmospheric conditions such as wind speeds, radioactive decay, radio noise, or various types of quantum-mechanical effects. Other entropy sources may represent phenomena that occur within engineered articles or devices, but are not easy to predict or control, such as shot noise, electrical noise, or thermal noise within various electronic devices, clock drift, movements of disk drive read/write heads, patterns of keyboard entries, and the like. At least in some cases, the phenomena or events at an entropy source 170 may need to be transformed from the analog domain to a digital domain to obtain the bit-sequences 202. A digitizer used for this type of transformation may include several subcomponents, as shown in the case of digitizer 271D in FIG. 2. In the depicted embodiment, a digitizer 271 may include a transducer 281 that is capable of detecting the analog phenomena or events, an amplifier 282 to enhance the detected signals, an analog-to-digital converter 283, and/or a sampler 284 configured to extract samples of the output of the analog-to-digital converter. Although digitizers 271 are shown as entities separate from the entropy sources 170 and the producer 160 in FIG. 2, in at least some embodiments, the digitizers may be subcomponents of the producers 160 and/or may be incorporated within or attached to the entropy sources 170. In some embodiments, some devices usable as entropy sources may produce bit-sequences without the help of an intermediary such as a digitizer 271—e.g., some entropy sources 170 may produce digital rather than analog output. In one embodiment, the provider network may include a set of hardware security devices dedicated for generating high-quality random numbers for security-related functions, and output produced by such hardware security devices may be used by at least some of the producers 160 of the service (e.g., in combination with the output of other entropy sources 170 accessible by the producers). For example, if during some time interval one or more of the hardware security devices are idle or not being used heavily for their primary purpose, their output may be added to the mix of sources used by one or more producers. In some implementations, one or more such hardware security devices may be designated as full-fledged members of the producer pool.

In the embodiment depicted in FIG. 2, different sets of entropy sources 170 may be used to produce random data for different consumers. As shown, source set 212A comprising entropy sources 170A and 170B may be used for consumer 120A's random data set 280A, while source set 212B comprising entropy sources 170B, 170C and 170D may be used for consumer 120B's random data set 280B. The determination as to which entropy sources are to be used for a given consumer may be made by or at the coordinator 180 in some embodiments, or by the producer 160 in other embodiments. The manner in which the bit-sequences from the various entropy sources are to be combined by the producer 160 may be governed by various combination algorithms 250 in different embodiments. In some embodiments, the producer 160 may be responsible for generating a pool of random bits for use by various consumers, and the bit-sequences 202 received may simply be "added" to the pool (e.g., by appending, prepending or inserting portions of the bit-sequences to the pool without modifying the bit-sequences) in accordance with the combination algorithm in use. Other mathematical functions or transforms may be used for the combination in other implementations.

FIG. 3 illustrates aggregation of random data generated by multiple random data producers, according to at least some embodiments. Just as bit-sequences from different combinations of entropy sources may be combined at a given producer 160 (as shown in FIG. 2), random data from different producers may be combined in some embodiments before the result is provided to consumers. Furthermore, in at least some embodiments, random data provided by the service (using output from one or more producers) may further be combined with locally-generated random data at the host at which the consumer application runs, as also shown in FIG. 3. In the embodiment depicted in FIG. 3, random data consumers 120A and 120B run on respective hosts 350A and 350B. Producer pool 133 comprises producers 160A-160D. A service data aggregator 310A may be configured to combine random data from producers 160A and 160B for eventual use by consumer 120A, and to provide a result of the combination (service-provided data 380A) to local aggregator 360A running on host 350A. Similarly, service data aggregator 310B may be configured to combine random data from producers 160B and 160C for eventual use by consumer 120B, and to provide the result (service-provided data 380B) to local aggregator 360B running on host 350B.

The local aggregators 360 shown in FIG. 3 may be configured to combine locally-generated random data (e.g., data derived from local entropy sources 370A-370N on host 350A, and data derived from local entropy sources 370P-370T on host 350B), with the service-provided random data to arrive at the final random data 365 that is received by the consumer 120. Thus, for example, final random data 365A in FIG. 3 may potentially be derived from three levels of data combination—first, a combination of output from various entropy sources at each of respective producers 160A and 160B, then a combination of output from data producers 160A and 160B, and finally a combination of the service-provided data 380A with locally-generated random data (e.g., in a primary entropy pool) at the host 350 where the consumer 120A runs. Similarly, final random data 365B provided to consumer 120B may be the result of combining data from producers 160B and 160C to arrive at service-provided data 380B, followed by combining data 380B with locally-generated data at host 350B. As a result of these combinations, the final random data 380 may differ from the service-provided data on which it is based, so that it is not possible for a service component (such as a service data aggregator 310 or a producer 160) to determine the final random data.

Figure 4:
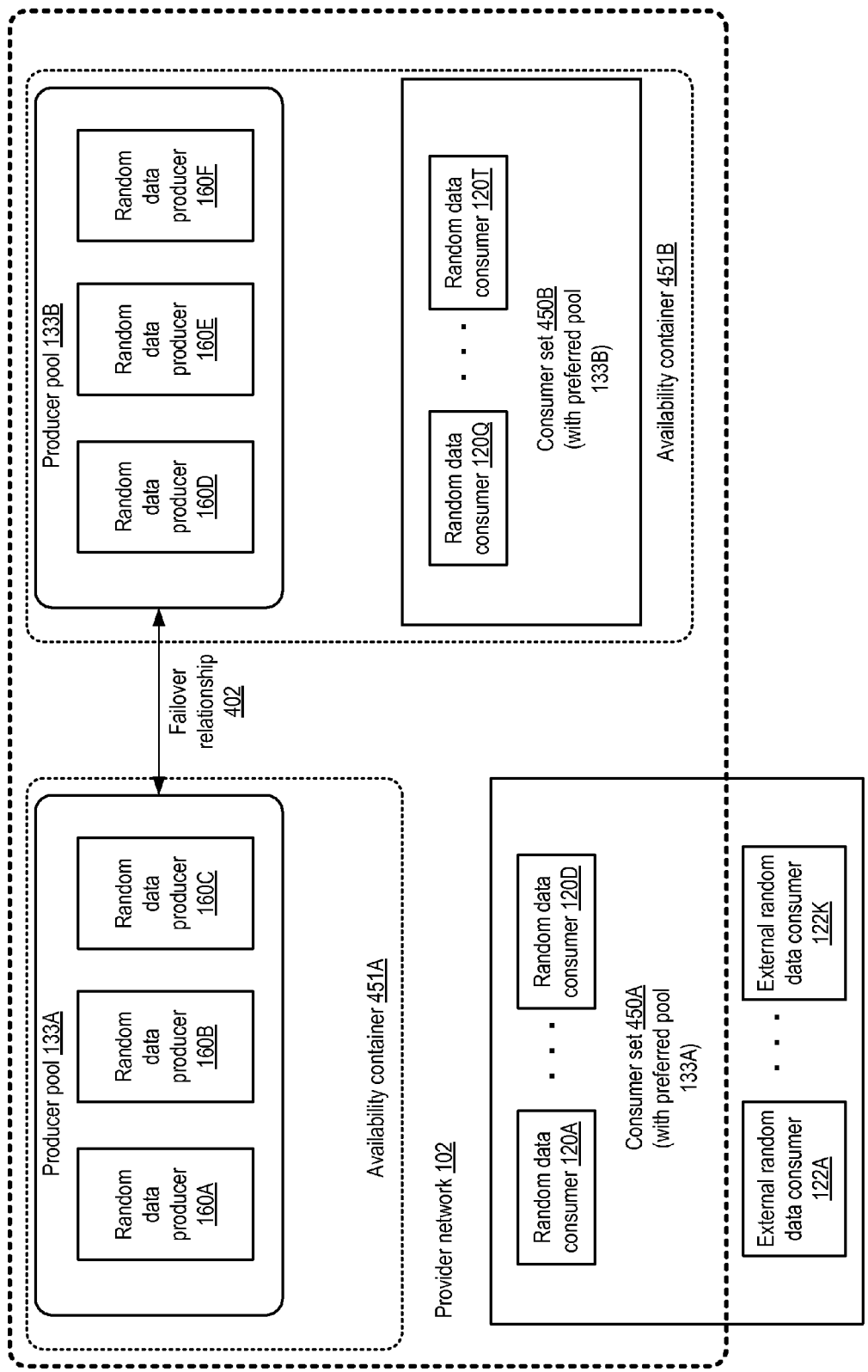
FIG. 4 illustrates an example of a distribution of random data producers across multiple availability containers of a provider network, according to at least some embodiments.

In at least some embodiments, as mentioned above, the provider network may be organized into a plurality of availability containers, such that the availability profile of each container is independent of the profile of other containers. Availability containers may be established to allow services of the provider network (and consumers of such services) to decrease the likelihood of severe disruptions that might occur if failures were correlated across all the resources of the provider network. Failures in one availability container may typically not be correlated with failures in other availability containers. In some implementations, the term "availability zone" may be used instead of "availability container". FIG. 4 illustrates an example of a distribution of random data producers 160 across multiple availability containers 451 of a provider network 102, according to at least some embodiments. Two availability containers 451A and 451B are shown in the provider network 102. In the depicted embodiment, each availability container 451 has a respective producer pool 133—e.g., producer pool 133A with producers 160A-160C in availability container 451A, and producer pool 133B with producers 160D-160F in availability container 451B. A failover relationship 402 has been established between the two producer pools, indicating that if failure (such as power outage or network disconnection) prevents the production or delivery of random data at the desired rate at either pool, the other pool may be used instead or in addition.

In the embodiment depicted in FIG. 4, consumers 120 and 122 are organized into consumer sets 450 (such as consumer set 450A and 450B) with respective preferred producer pools. Thus, for example, consumers 120A-120D and 122A-122K have producer pool 133A designated as their preferred pool, while consumers 120Q-120T have producer pool 133B designated as their preferred pool. Preferred pools may be designated based on various factors in different embodiments, such as geographical proximity to the consumers, pricing policies in use for the consumers (which may help determine the producers from which random data can be obtained most cost-effectively for a given consumer), and the like. Under normal operating conditions, when the service is to provide random data to any given consumer, one or more producers from the preferred pool for that consumer may be used. However, if failure or overloading at the preferred pool prevents the delivery of random data at the desired rate or in the desired quantities, the backup pool (e.g., pool 133B for consumers of set 450A) that has a failover relationship with the preferred pool may be used instead. Metadata regarding the membership of consumer sets 450, the mapping between consumer sets and preferred pools, and failover relationships may be maintained by the coordinator 180 in at least some embodiments. As shown in FIG. 4, some of the consumers of random data generated by a given pool in a given availability container may be executing within the same availability container (e.g. the hosts at which consumers 120Q-120T run are resident in availability container 451B in FIG. 4), while in other cases (such as consumers 120A-120D), the consumers may be outside the availability container in which the random data producers of their preferred pool are instantiated. Although the failover relationship 402 is shown between pools of producers in FIG. 4, in some implementations failover relationships may be established between individual producers instead of, or in addition to, between producer pools. In some embodiments, a given producer pool may comprise servers of multiple availability containers and/or multiple data centers. In some embodiments, the technique of establishing or maintaining preferred pools and/or consumer sets may not be implemented. Failover relationships between producers or pools may not be established in some embodiments.

Service Parameters, Policies and Interfaces

Figure 5:
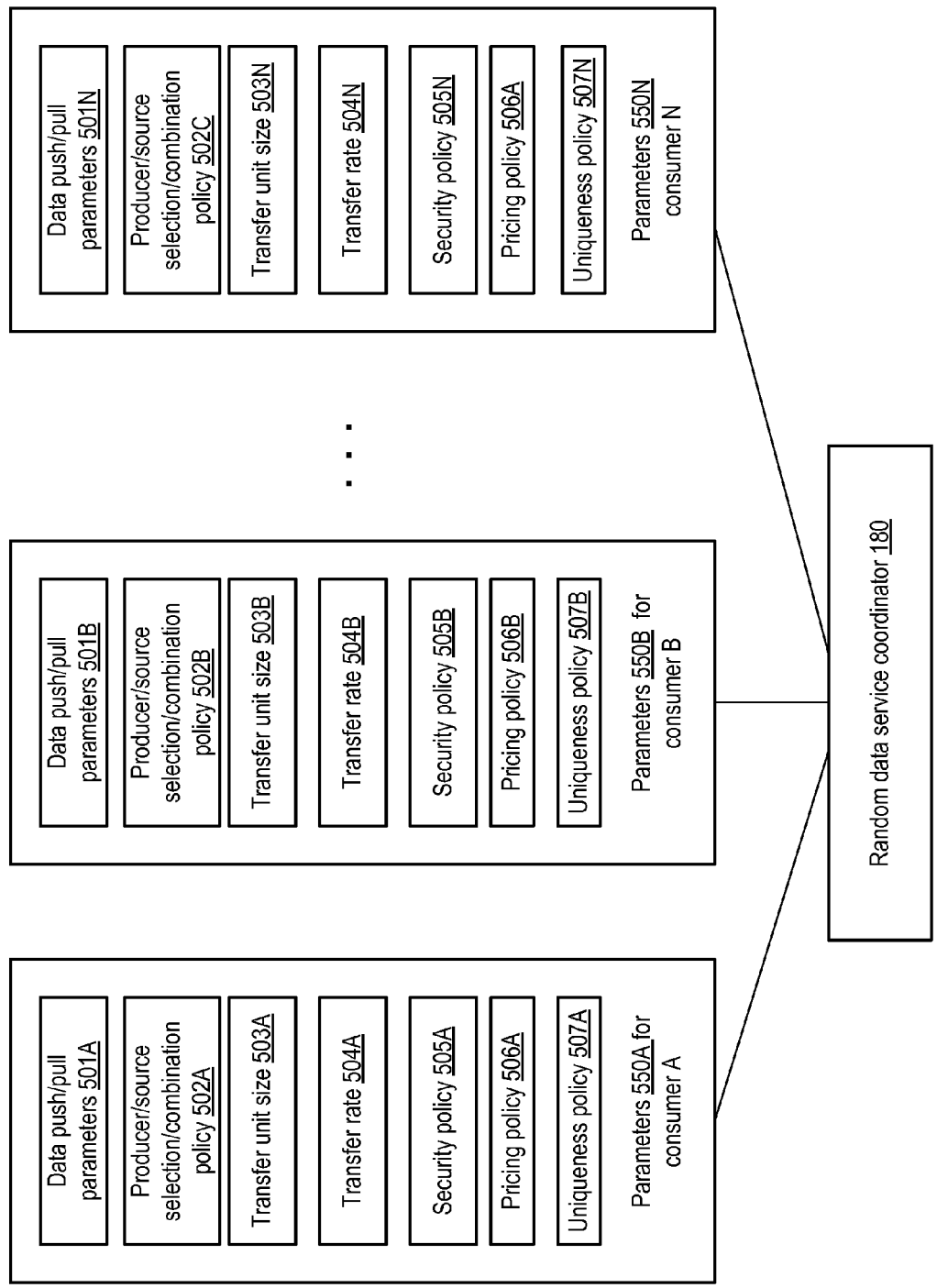
FIG. 5 illustrates examples of types of customizable parameters in accordance with which random data may be supplied by a service, according to at least some embodiments.

FIG. 5 illustrates examples of types of customizable parameters in accordance with which random data may be supplied by a service, according to at least some embodiments. Various combinations of the example parameters shown in FIG. 5 may be referred to as "service parameters" or "delivery parameters" herein. As shown, the coordinator 180 may maintain records of respective sets of service parameters for different consumers, such as parameters 550A for consumer A, 550B for consumer B, and 550C for consumer C. The consumers A, B and C may each be either an internal consumer 120 within the provider network or an external consumer 122 outside the provider network; similar parameters may be maintained regardless of the consumer type in at least some embodiments. For a given consumer, a parameter 501 (e.g., 501A, 501B or 501C for consumer A, B and C respectively) may specify whether data push, data pull or a combination of push and pull techniques are to be used for delivery of the random data in the depicted embodiment. Policies for selecting producers 160 and/or entropy sources 170 and combining data at various levels may be specified via parameters 502. In one simple scenario, for example, the selection policy for a given client may indicate that any random set consisting of a quorum of at least two entropy sources at any randomly-selected producer of any available pool may be used. In some implementations the selection policy may also indicate the combination algorithms (if any) that are to be used to combine random data from multiple sources, at either the producer level (combining data from multiple entropy sources), the service data aggregator level (combining data from multiple producers), and/or the local data aggregator level (combining data from the service with locally-generated random data).

Transfer unit size parameters 503 may indicate the quantity of random data (e.g., the length of a random bit-sequence) to be provided in one transfer or over some time period, while parameters 504 may indicate the transfer rate at which data is to be pushed to the consumer (if a push policy is to be implemented for the transfers). Indications of the security policies governing, for example, the type of encryption algorithm to be used for transmitting the random data to the consumer, or the certificate or signing mechanisms to be used, may be saved as parameters 505 in some embodiments. Security policy parameters 505 may include specifications or requirements for various security-related features such as confidentiality, authenticity, data integrity and/or replay protection in at least some implementations.

The pricing policies 506 may be recorded as well in some embodiments, indicating how the billing charges for providing the random data are to be computed. For example, a client may be billed based on a flat cost per random data bit, based on the rate at which random bits are provided, or using a dynamic pricing system such as spot pricing in which clients pay a variable price based on supply and demand for random data. Indications of the uniqueness policies to be applied to the random data may also be stored in the form of parameters 507 in some embodiments. In at least some embodiments, a set of default values for some of the parameters may be used for all the random data consumer applications of a given client or user of the provider network, with customization possible for the parameters of individual consumer applications as desired by the client or user. In some embodiments some or all of the example parameters shown in FIG. 5 may be specified explicitly for each request or each transfer, while in other embodiments the parameters may be specified for all the transfers of random data to be implemented for a given consumer or client over some specified time interval.

Figure 6:
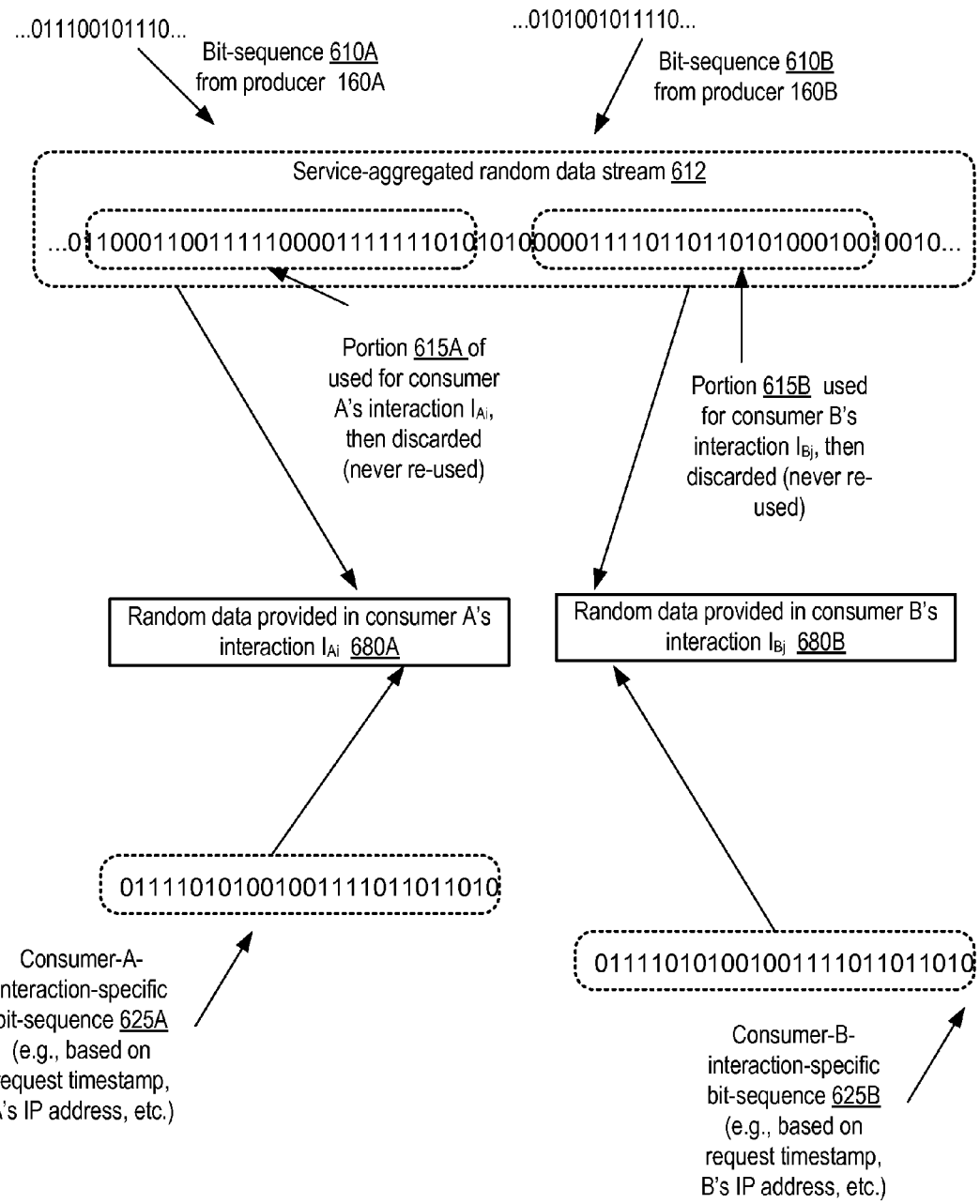
FIG. 6 illustrates aspects of implementing a uniqueness policy for random data generated by a service, according to at least some embodiments.

FIG. 6 illustrates aspects of implementing a uniqueness policy for random data generated by a service, according to at least some embodiments. The goals of a uniqueness policy may include, for example, ensuring (at least, with a very high probability) that it is not possible to predict the contents of a given set of random data provided by the service, based on knowing the contents of any other set of random data provided by the service. In the depicted embodiment, random data 610A and 610B from respective producers 160A and 160B may be combined into an aggregated stream 612 by the service (e.g., at a service data aggregator 310). A number of different approaches may be taken to ensure that the random data delivered to a given consumer in a given delivery interaction is not re-used for any other consumer or any other interaction in various embodiments, and that the random data delivered in any given interaction is not predictable based on other random data provided by the service in other interactions. For example, one technique for implementing a desired level of uniqueness may involve ensuring that the portion 615A of the aggregated stream 612 that is used for a given consumer A's interaction IAi (e.g., one transfer of random data to consumer A) is not reused for any other interaction such as interaction IBj for consumer B. Thus, portion 615A may be discarded or marked as used after being delivered as part of interaction IAi, and not reused thereafter. Similarly, after portion 615B has been used for interaction IBj, it may be discarded or marked as never to be used again. Such a one-use-only policy may significantly reduce the probability that the same random data is ultimately supplied to multiple consumers or in multiple consumer interactions.

In at least some embodiments, in addition to or instead of ensuring that a given set of producer-generated random data is used just once, an interaction-specific bit sequence may be generated for each customer interaction. For example, in one embodiment, if random data set 615A is selected at a given service aggregator S with IP address S_addr at time T for consumer A with a consumer identifier CID-A, where the consumer destination IP address is C_Addr, an interaction-specific bit sequence 625A (which may also be considered a global sequence number or nonce) may be generated as a function of any combination of (S_addr, T, CID-A, C_addr). Similarly, a different interaction-specific bit sequence 625B may be generated for consumer B's random data set 625A, based on any combination of the service aggregator's IP address, the consumer B's destination IP address, the time at which the random data is selected for B, and B's consumer identifier CID-B. The algorithm used, and the parameters on which the bit-sequences are based, may ensure that the chances that the same bit sequence is generated for two different clients may in general be vanishingly low. The interaction-specific sequence number may be provided to the consumer in some embodiments, e.g., as metadata associated with the actual random data provided. In some embodiments the interaction-specific bit sequence may be used to log the delivery of random data—e.g., the consumer may save the bit-sequences associated with various deliveries of random data from the service, and may be able to share the bit-sequences for auditing or tracking purposes (e.g., if the source or time of delivery needed to be discovered or investigated later). In some implementations, a consumer may be able to decode portions of the bit-sequence to verify that the associated data was provided by a trusted source (i.e., by the service instead of by a malicious entity) and/or that the time at which the data was provided (as indicated in the interaction-specific bit-sequence) was in a reasonable expected time range. In some embodiments the unique interaction-specific bit-sequence may be merged or combined with the producer-generated random data to determine the delivered random data.

Other approaches to uniqueness may be taken in some embodiments. For example, in one embodiment, for a consumer that has indicated a preference for a stringent uniqueness policy, the service may maintain a database of random data sets that have previously been supplied to the consumer, and check a newly-generated set of random data against that database to ensure uniqueness. In various embodiments, the clients on whose behalf the consumers are executed may specify various details of the uniqueness policies to be implemented, e.g., by selecting from among a set of uniqueness policy options or specifying a custom uniqueness policy. In some embodiments, the pricing policy to be applied for a given consumer or client may depend at least in part on the uniqueness policy in use.

Figure 7:
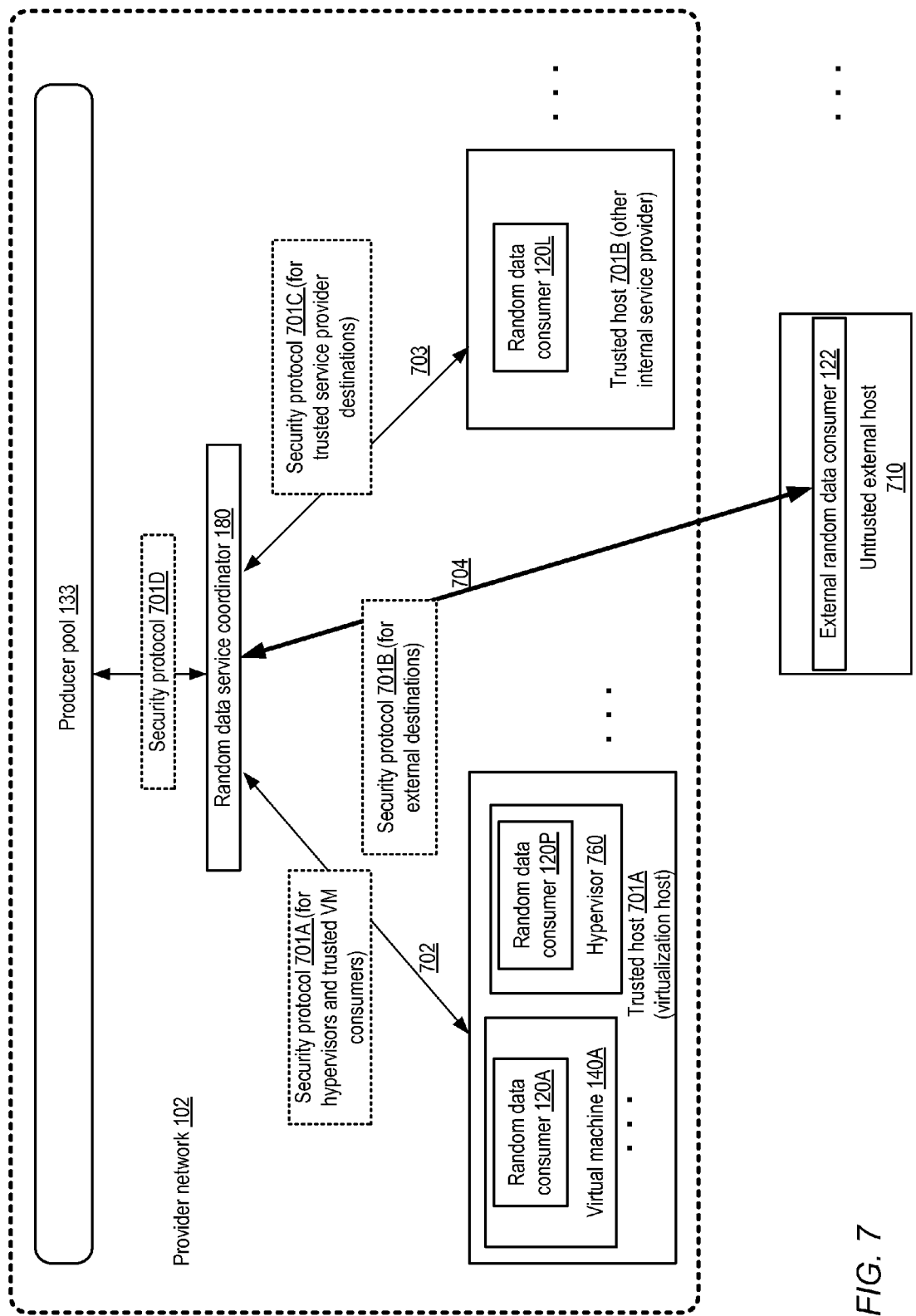
FIG. 7 illustrates examples of the use of several different security protocols for transmitting random data by a service, according to at least some embodiments.

Depending on the kinds of applications for which the random data provided by the service is to be used, different consumers or clients of the service may have different security needs in various embodiments. FIG. 7 illustrates examples of the use of several different security protocols for transmitting random data by a service, according to at least some embodiments. In the depicted embodiment, service coordinator 180 may be configured to distribute random data generated at producer pool 133 to consumers both inside and outside the provider network. Hosts within the provider network, such as hosts 701A and 701B, may be regarded as "trusted" hosts by the random data service, while hosts outside the provider network (such as host 710) may be considered "untrusted" hosts. The operator of the provider network may typically control the physical and logical security of its internal resources such as hosts 701A and 701B, and network traffic between the random data service and hosts 701A and 701B may be transmitted over internal, well-secured networks, thus leading to the designation of internal hosts and consumers running on the internal hosts as "trusted" hosts and consumers. As a result, for at least some trusted consumers, the service may be configured to use minimal or no additional security beyond what is already typically used for intra-provider-network communications (such as the use of a secure shell (SSH) mechanism). Thus, in the depicted embodiment, security protocol 701A, used when providing random data from the service to a trusted virtualization host 701A (e.g., either to a consumer 120P within hypervisor 760, or directly to an application consumer 120A running on a guest virtual machine 140A) may be relatively lightweight.

Some of the consumers of random data may include other services (e.g., services not directly responsible for providing guest virtual machines) implemented within the provider network. Depending on the nature of the consumer service (for example, if the service is itself a provider of high-quality cryptographic functionality, or provides high-performance computing capabilities for research efforts with national security implications), additional levels of security may be desirable for random data transmissions even though the service runs on trusted hosts and the random data may be transmitted entirely on network paths internal to the provider network 102. In FIG. 7, consumer 120L represents such a service, for which a more sophisticated security protocol 701C may be employed when transmitting random data. In some embodiments, security protocols (such as protocol 701D shown in FIG. 7) may also, or instead, be implemented between the random data producers of pool(s) 133 and the service coordinator 180. The nature of the security protocol employed between a given producer and the coordinator may vary in different implementations, depending for example on factors such as the number of links or hops included in the network path between the producer and the coordinator, and/or on the security preferences of the clients to which the coordinator supplies random data generated by the producer.

Transmissions of random data to untrusted consumers, such as external consumer 122 running on untrusted host 710, may pass through network links and devices over which the provider network has no physical or logical control. Accordingly, the random data service may implement additional security protocols (e.g., protocol 701B) for such external consumers in some embodiments, in which for example in addition to transmitting a set of random data, a digest or digital signature of the data may be provided, or a key-based encryption mechanism using client-provided keys may be used. In at least some embodiments, the random data service may implement lightweight security protocols by default for internal consumers running on trusted hosts, and a more heavyweight security protocol by default for external consumers. Clients may be able to specify the level of security they wish to employ for their random data in some embodiments, e.g., by selecting from among a plurality of supported security policies using a programmatic interface, or by providing details of a desired custom security policy. In some embodiments, the service may be configured to infer the security protocol or policy to be used, e.g., based on the network address to which the data is to be provided (using higher security levels for addresses outside the provider network than for addresses inside the provider network, for example), or based on the type of application consuming the random data if the type is known or can be deduced (e.g., from the API calls used for the random data). The security protocols 701 employed in a given embodiment may be selected based on service requirements or service specifications for confidentiality, authenticity, data integrity and/or replay protection (the prevention of replay attacks in which valid data transmissions may be maliciously or fraudulently repeated or delayed). In at least some embodiments, some or all of the security protocols 701 may rely at least in part on trusted, industry-standard techniques such as the use of secure sockets layer (SSL) and the like, which may inherently provide some of the required confidentiality, authenticity, data integrity and/or replay protection support without requiring additional programming effort. Security protocol selection and/or implementation may also be determined in some embodiments based at least in part on anticipated (or measured) vulnerability levels of the producer or the various network paths involved to malicious attacks, or on the number and nature of detected attempts to breach security of the random data service.

Programmatic Interfaces

Figure 8:
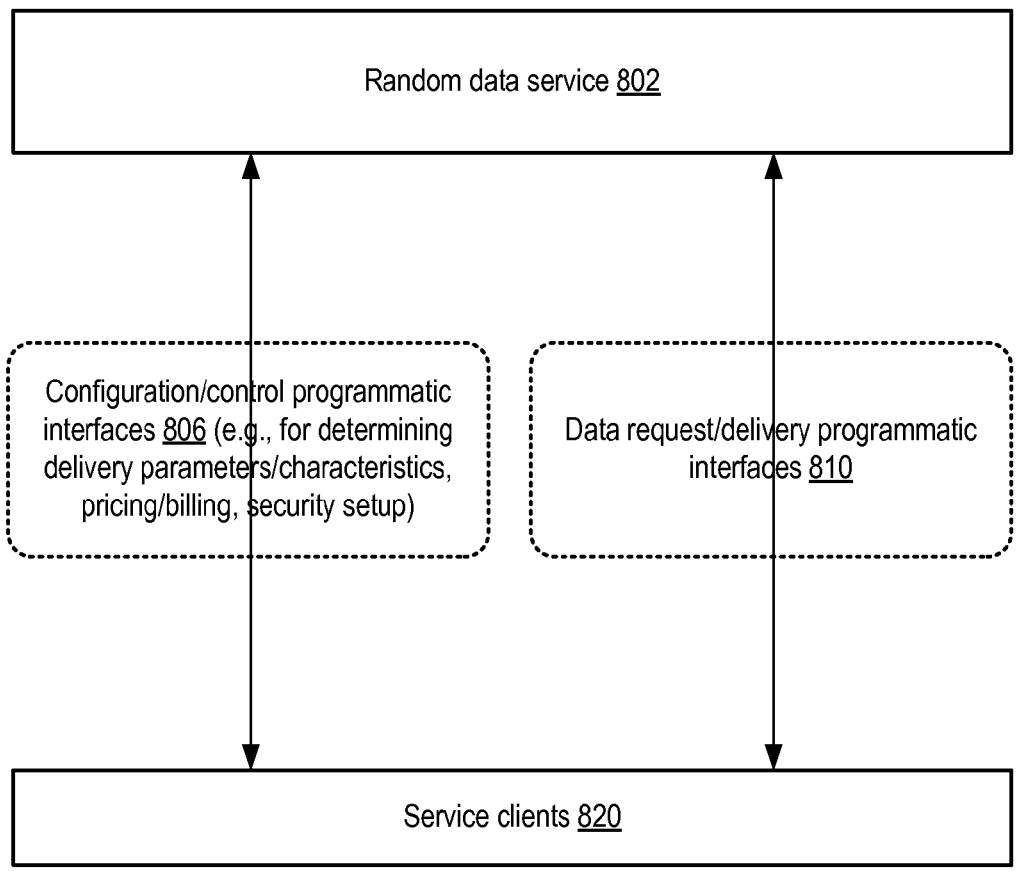
FIG. 8 illustrates a high-level overview of the types of programmatic interfaces that may be implemented by a service providing selectable-quality random data, according to at least some embodiments.

FIG. 8 illustrates a high-level overview of the types of programmatic interfaces that may be implemented by a service 802 providing selectable-quality random data, according to at least some embodiments. As shown, two broad categories of programmatic interfaces may be implemented: configuration and control interfaces 806, and request and delivery interfaces 810. The interfaces of either category may include any combination of one or more APIs, web pages, command-line tools, graphical user interfaces and the like in various embodiments. Configuration/control interfaces 806 may allow service clients (e.g., administrators or other authorized users of the random-data consuming applications, or the applications themselves) to specify preferences or requirements regarding various characteristics of the random data to be provided. Some or all of the types of parameters illustrated in FIG. 5, among other characteristics, may be specified using configuration/control interfaces 806 in various embodiments. For example, whether a push model, a pull model, or a hybrid model with both pull and push features is to be used may be indicated using control interfaces. Random data quality requirements, selection policies for producers 160 and/or entropy sources, random data transfer unit sizes and rates, security policies, pricing policies, uniqueness policies and the like may be indicated via one or more of the configuration/control interfaces 806 in different embodiments. Configuration and control interfaces 806 may be used at different granularities (e.g., at the individual request level, or based on applicability periods such that the specified configuration settings are to apply to all random data interactions for a given consumer for some time period) in various embodiments. Metadata about the applicability of the preferences or requirements (such as how long a given set of entropy source preferences are to remain in effect) may also be specified in some embodiments using programmatic interfaces 806. In some implementations, consumers or clients may be able to specify exclusion requirements regarding some aspects of the service: e.g., a given client may not wish to use keyboard interrupt entropy sources, or may wish to avoid the use of a particular security protocol, and may indicate such needs via a control interface.

In contrast to the configuration/control programmatic interfaces 806, which may be used to specify various desired properties of the random data, data request/delivery interfaces 810 may be used for requesting (e.g., in pull models) and/or transmitting the random data itself (e.g., in either pull or push models). In at least some embodiments, preferences or requirements for some of the random data characteristics (e.g., entropy sources, or data quality) may be specified in the form of parameters passed along with requests for random data using interfaces 806—that is, different aspects of the same interface may be used for configuration and for data transfer. It is noted that in at least one embodiment, the fact that a particular programmatic interface is being used for providing or receiving random data may not be apparent to the applications (or even the operating system components) that ultimately consume the random data. For example, as noted earlier, in some embodiments, random data provided by the service may be merged into a primary entropy pool, e.g., by a hypervisor component on a host at which multiple guest virtual machines are to be run, where the primary entropy pool may comprise random data collected from local entropy sources and from the service. In some such embodiments, the use of the service may be transparent to the applications and operating system, in that for example the same set of method or function calls may be made for random data that would have been made even if the random data service were not implemented. Underneath the covers, the quality of the random data in the primary entropy pool may be enhanced, without requiring any programmatic changes to the applications or to the operating system in such scenarios. One set of programmatic interfaces may be used to obtain the random data from the service by an intermediary component such as a local aggregator in such an implementation, while a different set of interfaces may be used for providing the random data to client applications from the intermediary, and no modifications may be needed to the client applications in such implementations. In other implementations, application-level code or operating system code (such as kernel components or drivers) may be modified to use the service-provided data, or the client applications may themselves be modified to directly use a programmatic interface to obtain random data from the service without going through an intermediary component. In at least some implementations, as described below in further detail, a component of the random data service 802 may be configured to make decisions regarding whether service-provided random data is to be used or not for a given random data interaction, e.g., by intercepting or trapping a function call or method invocation made from higher layers of the software stack using one of the programmatic interfaces 810. In some embodiments, various default settings may be used to govern configuration of the random data for a given consumer, such that even though a number of programmatic interfaces 806 may be available for customizing the service, the consumer may not be required to use those interfaces if the default settings suffice.

As noted earlier, a number of different types of programmatic interfaces may be used for configuring and using the random data service in various embodiments. FIG. 9 illustrates an example web-based interface enabling a client of a random data service to specify some of the properties of random data to be provided, according to at least some embodiments. As shown, the interface may include a web page 902 comprising a message area 903 and a set of form fields 971 for specifying various characteristics of the random data. In several cases, default values for the form fields may be provided by the service, allowing the client to make modifications only as necessary, or to accept the defaults. Field 905 may identify the client account that is to be billed for the random data. The client may specify the destinations to which the service is to supply random data, and the delivery mode, using field 907 in the depicted embodiment. For example, as shown, by default all the virtual compute instances (e.g., the guest virtual machines 140 shown in FIG. 1) associated with, or billed to, the client may be allowed to use the service, and a pull mode of delivery may be employed, where random data is supplied in response to explicit requests instead of being supplied even in the absence of requests. As in several of the form fields shown, the client may modify the default setting for field 907 by clicking on a provided link.

The specific applications to which the service-provided random data is to be supplied may be indicated using field 909 in the depicted embodiment. By default, all applications on the destination hosts may be allowed to use the service, as shown. An indication of the quality of random data to be provided (which may be used by the service to determine the number of producers 160 to use, and/or the specific types of entropy sources to use, for example) may be provided using field 911. The default setting indicates that the service is to be allowed to choose the quality of random data based on the application requesting the data (e.g., the service may decide to provide a higher quality of data to a cryptographic application than to a sequence number application). Clients may specify a desired security protocol using field 913; by default, as shown, the service may use a protocol used for trusted hosts of the provider network. If a client has a special uniqueness requirement for its random data, such a requirement may be indicated using form field 915 in the depicted embodiment.

Field 917 may be used by a client to select a pricing policy for random data from among several supported pricing policies in the depicted embodiment. For example, by default the client may be billed US$0.10 for up to a million bits of random data per day, as shown. The client may also use the web page 902 to indicate a notification policy, e.g., so that the client is informed if the total amount of random data consumed at its destination host and applications exceeds a threshold value. One or more notification mechanisms (such as e-mail, text messages, or a notification service destination address) may be specified, as well as the criteria to be used to determine if a notification is required, in some embodiments. In addition to using the depicted from fields, clients may specify further customization (e.g., to specify random data quality specifically for one application that differs from the quality to be used for other applications) using the provided link 921 in the depicted embodiment. The requested settings may be submitted using the "apply" button 990. It is noted that similar preferences may be indicated using other types of interfaces such as APIs, command-line tools and the like, instead of or in addition to using web pages of the kind depicted in FIG. 9, in various embodiments.

Methods for Random Data Service

Figure 10:
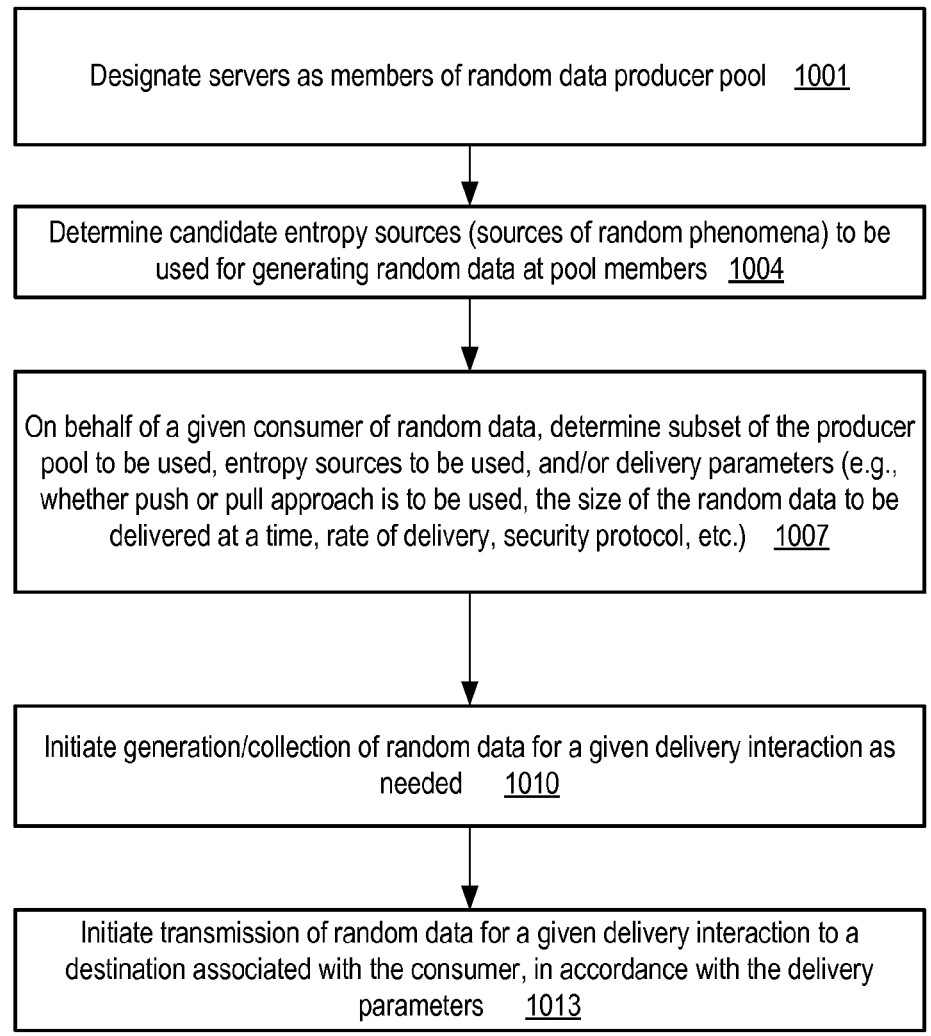
FIG. 10 is a flow diagram illustrating aspects of operations that may be performed to provide random data from a designated pool of servers of a provider network, according to at least some embodiments.

FIG. 10 is a flow diagram illustrating aspects of operations that may be performed to provide random data from a designated pool of servers of a provider network, according to at least some embodiments. As shown in element 1001, one or more servers of a provider network may be designated as members of a pool or fleet of producers to be used to provide random data (e.g., in the form of random bit sequences or bit strings) to a plurality of consumers or clients. In some embodiments, general-purpose or commodity servers may be designated as members of the producer pool, while in other embodiments, special purpose servers that have been designed or configured specifically for random data generation may be used. The number of servers to be included in the pool, and the placement of the servers in various data center locations, availability containers or geographical regions may be determined based on expected rates of random data consumption, availability and redundancy requirements, and/or requirements for resiliency against attacks in various embodiments. Various types of consumers may be served with random data in different embodiments, including for example hypervisor components that are configured to provide random data to operating system components or end-user applications on virtual machines instantiated at the virtualization hosts, operating system components, end-user applications requiring random numbers, software components configured to implement various other services of the provider network, and so on. In some embodiments, consumers both within the provider network and outside the provider network may be supported, while in other embodiments, only internal components may be supported or only external consumers may be supported.

For each of the producers, one or more candidate entropy sources (e.g., sources of random phenomena or events that are either already available in digital form, or can be converted to random digital sequences) may be identified in the depicted embodiment, as shown in element 1004. Any of a variety of entropy sources may be selected as candidates for a given producer, including for example various sources of noise (electrical or thermal noise), sources of electromagnetic or radioactive events, interrupt sequences from keyboards or disk drives, and so on. In some implementations special purpose devices specifically configured to generate random signals or random data of high statistical quality may be used as entropy sources.

On behalf of a given consumer of random data, a subset (or all) of the producers to be used may be determined, as well as the specific entropy sources to be employed (element 1007). Various delivery parameters may also be determined, such as whether a pull model or a push model is to be used when providing the data to the consumer, the units or size in which random data is to be provided, the format of the data, the rate at which the data is to be provided, the security protocol to be used, and so on. Some or all of the sources (e.g., the producers and/or entropy sources) and delivery characteristics may be determined based on preferences or settings indicated on behalf of the consumer (e.g., using programmatic interfaces such as various APIs or the type of web page shown in FIG. 9) in one embodiment. The sources and/or delivery characteristics may be inferred for certain kinds of consumers, or may be inferred based on the type of application that is to use the random data in some embodiments. In at least some embodiments, some of the characteristics may be specified as parameters of API calls made for the random data.

The generation and/or collection of random data at the various producers and entropy sources involved in a given delivery interaction may be initiated as needed (element 1010). In some embodiments, after a set of entropy sources and/or producers is initially configured to start producing random data, a stream of random data may be produced without requiring further explicit commands or requests, and portions of the stream may be used as needed for various consumers. Based on the applicable delivery parameters applicable, transmission of the random data for a given interaction may be initiated to the destination configured to receive the data on behalf of the consumer in the depicted embodiment (element 1013). In some implementations a destination may comprise an intermediary such as an entropy extraction module executing on the host at which the consuming application or operating system runs, or some other local aggregator of random data, while in other implementations the raw random data may be provided directly to the consumer. Collection or combination of random data (e.g., as shown in FIG. 2 and FIG. 3) using any of a variety of combination techniques may be performed at a component of the random data service in some embodiments. In at least some embodiments, minimal or no changes may be required at either the end-user application level or the operating system level to take advantage of the random data service—for example, lower-level software such as a hypervisor component may simply use the service-provided data to enhance the quality and/or size of a local entropy pool on a host where the consumer runs, without changing the way in which the random data is provided to the higher levels of the software stack. Furthermore, in at least one embodiment the final random data actually received by a consumer at a given host may be different from that provided by the service (e.g., as a result of the combination of random data from various sources including local entropy sources at the host), to decrease the probability that an attacker that breaches the service is able to determine the final random data consumed.

Figure 11:
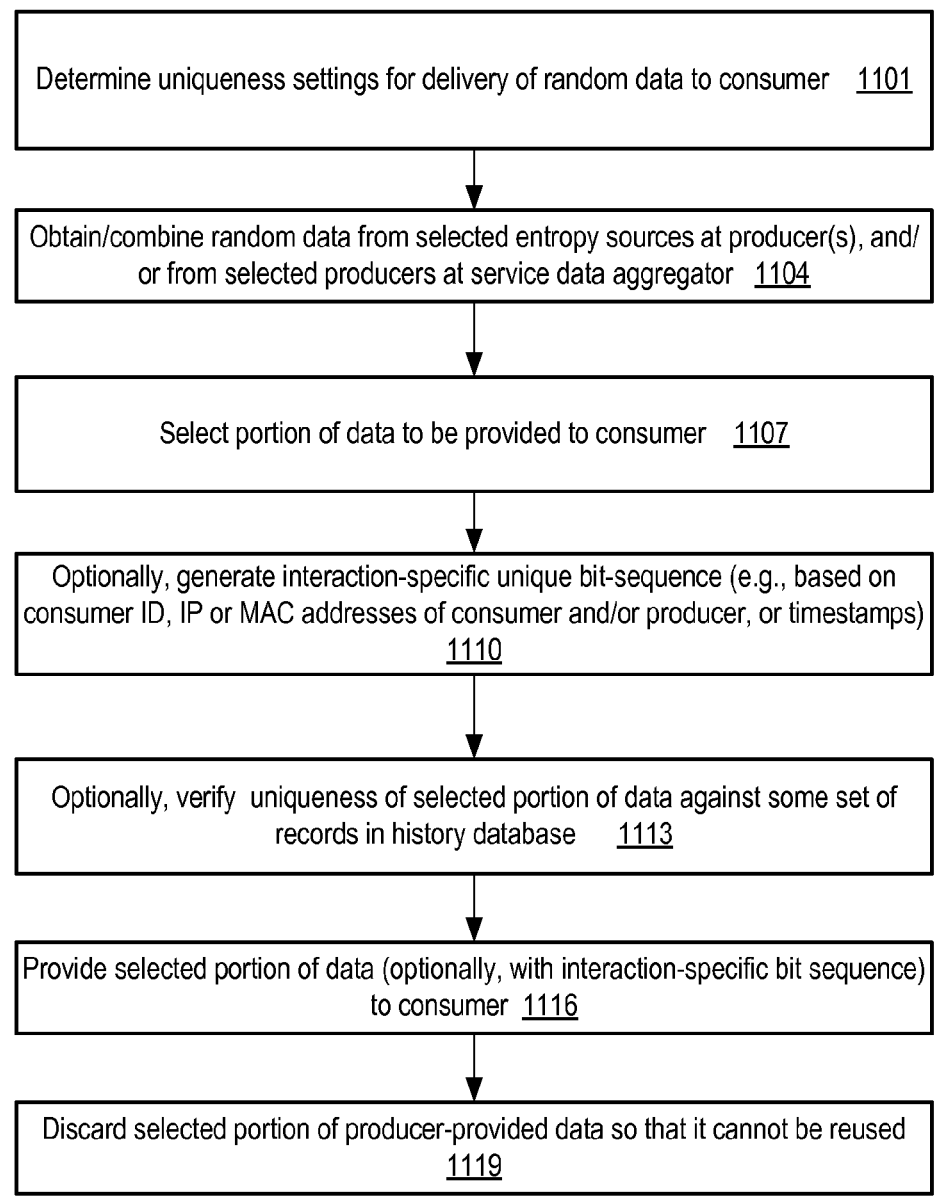
FIG. 11 a flow diagram illustrating aspects of operations that may be performed to provide random data with a desired level of uniqueness, according to at least some embodiments.

In some embodiments, as noted above, the random data service may be configurable to ensure, with some high probability, that the random data provided in one consumer interaction differs from that provided in other interactions in some statistically significant way, and the service may support various data uniqueness policies. FIG. 11 a flow diagram illustrating aspects of operations that may be performed to provide random data with a desired level of uniqueness, according to at least some embodiments. The uniqueness settings for a given consumer may be determined (element 1101), e.g., based on requirements or preferences supplied by or on behalf of the consumer using a programmatic interface such as an API or a web page. Based on the uniqueness settings as well as on other relevant delivery parameters, random data may be obtained from one or more selected entropy sources at one or more producers, and may be combined at various levels (element 1104)—e.g., random data may be combined from several entropy sources at a given producer, and/or random data from several producers may be combined at a service data aggregator.

As a result of the combination, a pool of random data may become available at the service, from which distinct subsets or portions may be selected for delivery to respective consumers (element 1107). The combination of the data at any of the levels may involve simple operations such as adding newly-received data into a buffer as it arrives in some implementations, and more complex processing or combination functions on other implementations. In at least one embodiment, once a given portion of random data is selected for providing to a given consumer, that portion of random data may be discarded (or marked) so that it is never used again, thus supporting at least one level of data uniqueness.

In at least some embodiments, e.g., in order to provide enhanced support for uniqueness, an interaction-specific bit-sequence, intended to be unique for that interaction, may also be generated (element 1110). Depending on the implementation, such a unique bit sequence may be derived from one or more of: a client identifier or consumer identifier associated with the delivery of the random data, a timestamp indicative when the data is generated, requested or transmitted, an IP address or MAC address of the consumer and/or the producer, identifications of the entropy sources used, or other characteristics of the interaction. In one embodiment, a history of the random data previously supplied to a given consumer (or to all consumers) may optionally be maintained, and the service may check or verify whether the specific set of data it has selected for a consumer is unique using the history. The number of history records maintained (and/or checked) may be limited in some such embodiments, e.g., only records for the last hour or last day may be retained at any given time, to reduce the storage cost of maintaining the history and/or the computation cost of verifying uniqueness. The extent to which verification against history records is to be implemented may be configurable on behalf of a given consumer or a given set of consumers in some embodiments.

The selected portion of random data may be provided to the consumer, optionally together with the interaction-specific bit sequence (element 1116) in the depicted embodiment. The portion of the random data used for the interaction may be discarded as mentioned above (element 1119) so that it is never re-used. In some implementations the interaction-specific bit sequence may be considered a globally-unique sequence number or a nonce. The interaction-specific bit sequence may be logged in some implementations, e.g., together with the provided random data, either at a component of the service, or by the consumer, or at both the service and the consumer, so that auditing or analysis of the random data service may be performed if needed.

Figure 12:
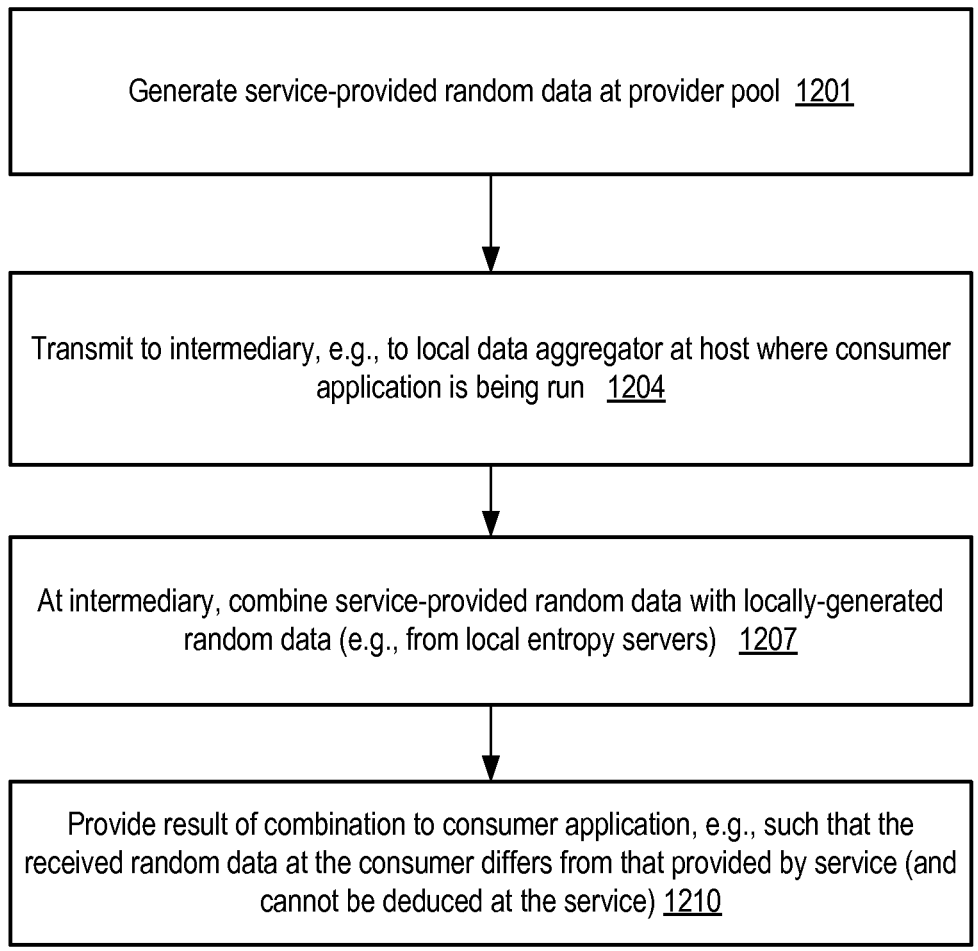
FIG. 12 is a flow diagram illustrating aspects of operations that may be performed to combine service-provided random data with locally-generated random data at the host where the random data consumer executes, according to at least some embodiments.

FIG. 12 is a flow diagram illustrating aspects of operations that may be performed to combine service-provided random data with locally-generated random data at the host where the random data consumer executes, according to at least some embodiments. One or more entropy sources may be employed at one or more producers of a producer pool 133 to generate the service-provided portion of random data (element 1201). The service-provided data may be transmitted to an intermediary, such as a local data aggregator component present at the host at which the consumer runs (element 1204). In some implementations, the intermediary may be a component of a hypervisor or an operating system, for example.

At the intermediary, the service-provided data may be combined with locally-generated random data (e.g., from one or more local entropy sources at the host) (element 1207). In some implementations, the service-provided data may be added to a primary entropy pool (e.g., a buffer or pool of random bits to be used by local entropy extraction components for random-number-related operations). Depending on the nature of the local sources of entropy available, the combination of the server-provided random data with the locally-generated random data may enhance the quality of the primary entropy pol substantially. For example, some hosts may typically rely on hardware interrupt sequences (such a keyboard entry sequences or mouse click sequences) to populate their local primary entropy pools. However, in several scenarios such as in virtualized compute environments, the hardware interrupt sequences that are natively or locally available at a given host may suffer from several quality problems, including, for example, the following: (a) the host hardware may be shared by multiple virtual machines, and as a result different virtual machines may have to rely on the same interrupt sequences, which may reduce the statistical independence of the random data that can be provided to consumers at different virtual machines; (b) in at least some scenarios, there may not be very many hardware interrupts of the types most often used for random data generation, further reducing the quality of random data that can be generated; (c) the quality of the locally-generate random data may vary over time, e.g., based on time since host boot or virtual machine startup. The combination of random data from even one high-quality entropy source of the service with the pool of locally-generated random data (even if several different local entropy hosts are used) may thus result in substantially improving the statistical quality of the random data for the consumer in such environments. The result of the combination may be provided to the consumer (element 1210). The combination with locally-generated random data may also have the security benefit that the final data received by the consumer is different from that provided by the service, and it may be impossible to deduce the final random data at the service in at least some implementations. Thus, in the unlikely event that a malicious attacker successfully penetrates the random data service, the attacker would still not be able to determine the random data used by the consumer, even though the data would have been generated based at least partly on the service's output.

Figure 13:
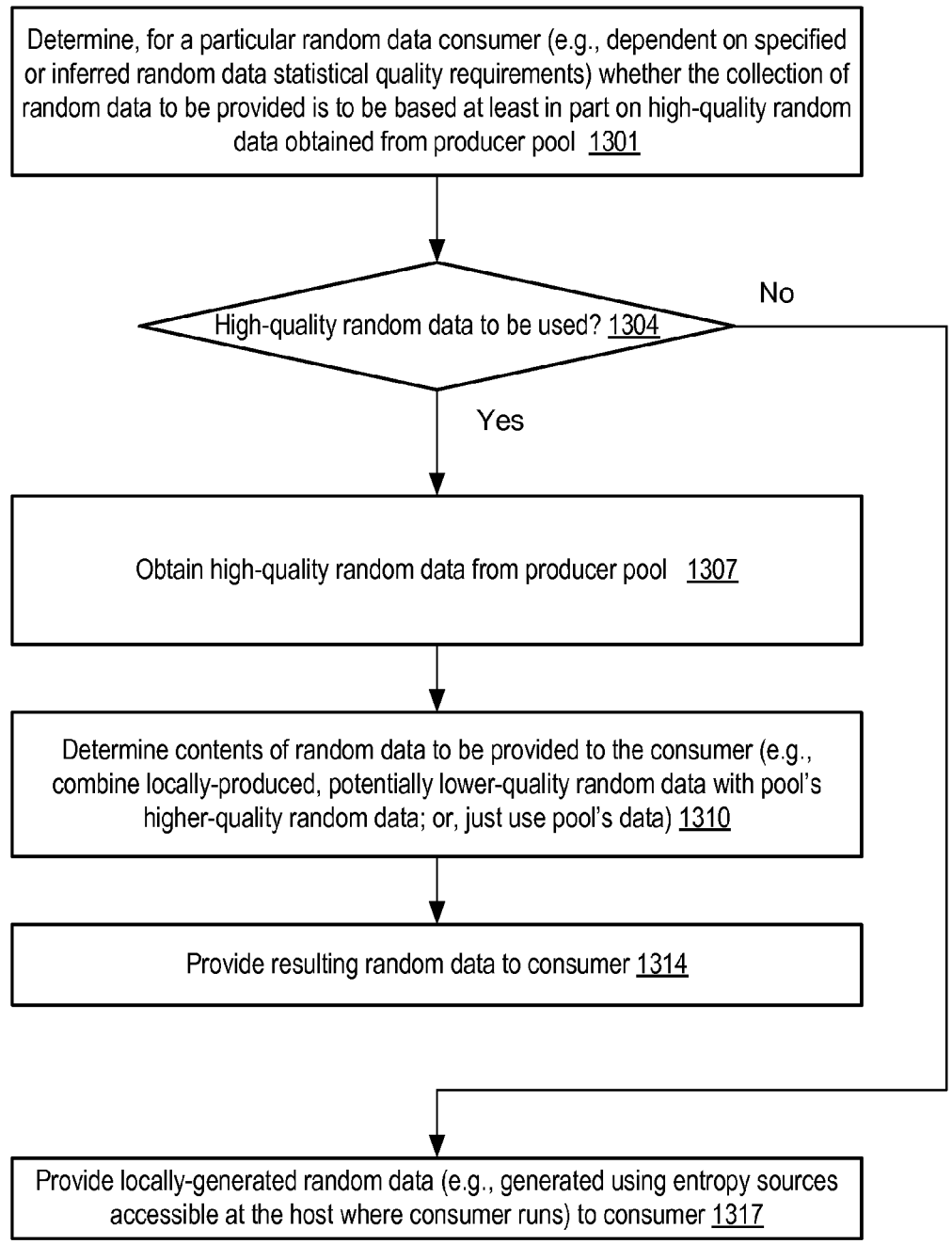
FIG. 13 is a flow diagram illustrating aspects of the operation of a random data service component deployed locally to determine whether service-generated data is to be used at the host at which a random data consumer executes, according to at least some embodiments.

In some embodiments in which locally-generated random data is available at the host at which a consumer runs, it may be the case that certain consumer requirements can be met using the locally-generated data alone, while other needs for random data may require the use of potentially higher-quality service-provided data. FIG. 13 is a flow diagram illustrating aspects of the operation of a random data service component deployed locally to determine whether service-generated data is to be used at the host at which a random data consumer executes, according to at least some embodiments. The local component, e.g., a local aggregator of random data or a local entropy extractor, may determine, for the consumer, whether a collection of random data to be provided should be based at least in part on high-quality random data obtained from a producer pool 133 of the random data service (element 1301). The decision as to whether to use service-provided data may be made at a per-interaction granularity (e.g., for a given set of random data to be obtained as a unit), or at the granularity of a plurality of interactions (such as all requests for random data for a given end-user consumer application process). If high-quality service-generated data is to be used (as determined in element 1304), the service-generated data may be collected directly or indirectly (e.g., from the producers of the pool directly or through service data aggregators) (element 1307).

The contents of the final set of random data to be provided to the consumer may then be determined (element 1310). In at least some implementations, the producer pool's data may be combined with locally-generated data, e.g., by adding the producer pool's data to a local entropy pool or buffer. In one implementation, the producer pool's data may be provided to the consumer without any mingling or combination with locally-generated data, even if local sources of random data are available. The contents may then be provided to the consumer (element 1314). If a decision is made that locally-generated data is sufficient (as also determined in element 1304), a portion of locally-generated random data may be provided to the consumer, as shown in element 1317. The decision as to whether a combination of producer-pool data and local data is required, or whether local data is adequate, may be made based on various parameters or settings in different implementations, for example based on specified requirements of the consumer, on inferred random data quality needs of the consumer, or on pricing/billing considerations (e.g., if the customer on whose behalf the consumer application is run has allocated a limited budget for service-generated random data, and the budget is exhausted, locally-generated data may be used).

Figure 14:
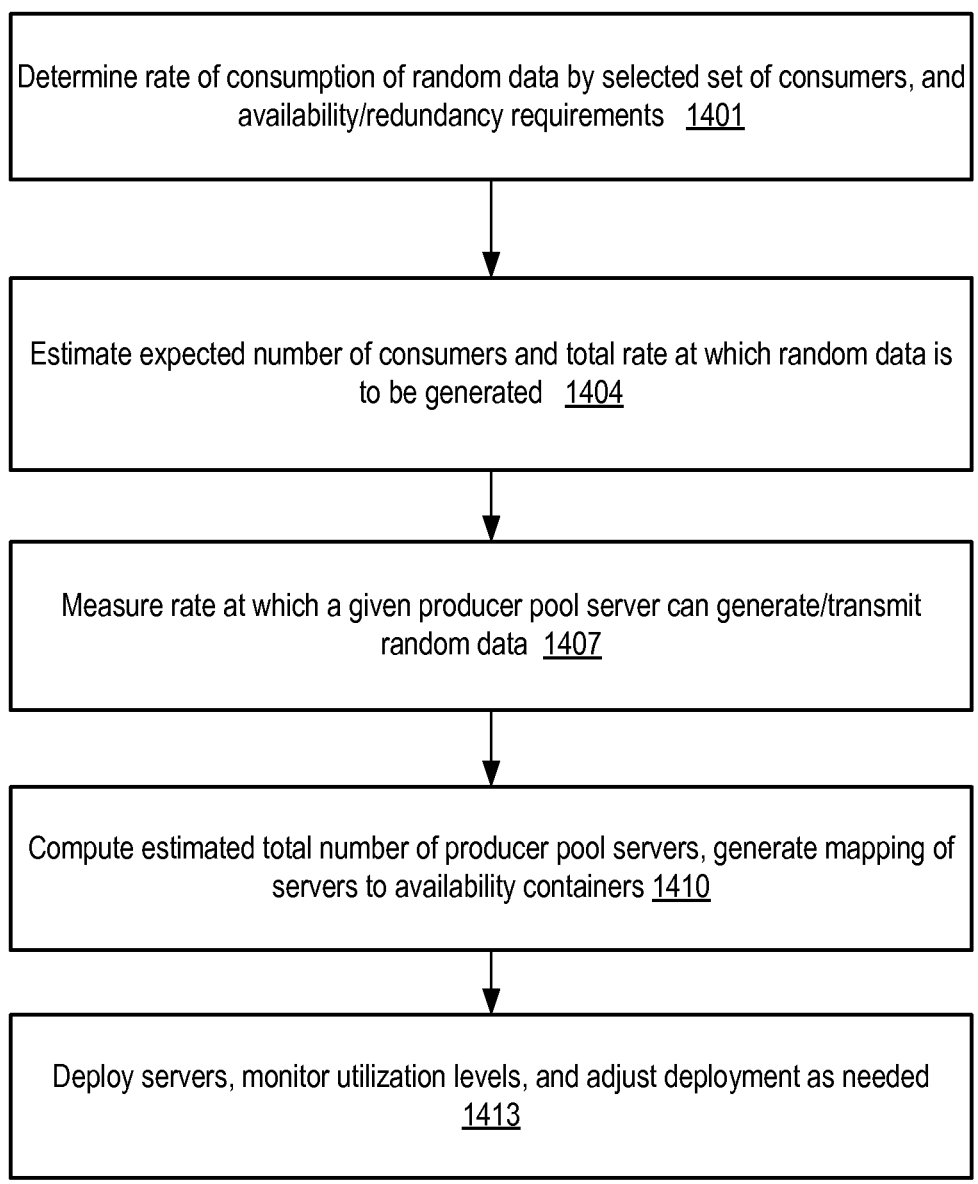
FIG. 14 is a flow diagram illustrating aspects of operations that may be performed to determine the number of servers to be included in a pool of random data producers, according to at least some embodiments.

As mentioned above, the size of a producer pool to be employed for the random data service, and the placement of the producers, may be determined based on a variety of factors in different embodiments. FIG. 14 is a flow diagram illustrating aspects of operations that may be performed to determine the number of servers to be included in a pool of random data producers, according to at least some embodiments. As shown in element 1401, a rate of consumption of random data by a selected set of consumers may be determined. The set of consumers may represent a random sample of typical consumers that are supported by the service, for example, or may represent a sample of a specific subset of consumers (e.g., applications of customers who are known to run high-end cryptographic programs). Measurements of random data usage may be conducted (e.g., either in an environment where the random data service is not yet available, or in an environment where the random data service with some set of producers already set up as a temporary pool is available). In addition, the availability and redundancy requirements for the random data service may be determined (for example, in accordance with other availability/redundancy requirements supported in the provider network, such as compute server availability requirements).

As shown in element 1404, an expected number of random data consumers and their average rates of consumption may be computed. The rate at which an average server of the type to be deployed as a producer is able to generate (and transmit) random data using a selected set of entropy sources may be measured, e.g. using a standard suite of random data generation tests (element 1407). The total number of servers to be included in the pool may then be computed (element 1410) and mapped to a selected set of data centers and/or availability containers based on the redundancy or availability requirements. For example, if each producer can generate and transmit N1 bits of random data per second, the total estimated rate of consumption is C1 bits per second, and triple redundancy is required (i.e., three producers are to be configured for availability purposes for every one producer needed purely for performance), then the total number of producers may be estimated as (C1*3)/N1 in one simple implementation, and the servers may be equally distributed among three availability containers. Having determined the number and geographical placement of the producer pool, the servers of the pool may be deployed (element 1413). The utilization levels of the pool members and associated network links used for transmitting the random data may be monitored, and the deployment (e.g., the total number and/or placement of the producers) may be adjusted as needed based on changing workloads. The bottleneck resources that govern the maximum rate at which random data can be generated may differ from one implementation to another—e.g., the entropy sources may be the bottleneck, the processing or memory resources at the servers may be the bottleneck, or network links or devices may be the bottleneck. Monitoring of the service may help identify which set of resources need to be adjusted—e.g., it may be possible to add entropy sources to speed up the rate at which a given producer transmits random data, without changing other software or hardware characteristics of the server being used as the producer. In at least some embodiments, statistical tests may be run to obtain measures of the quality of random data being produced, and adjustments to the entropy sources and/or combination techniques may be made as needed to meet desired levels of quality.

Figure 15:
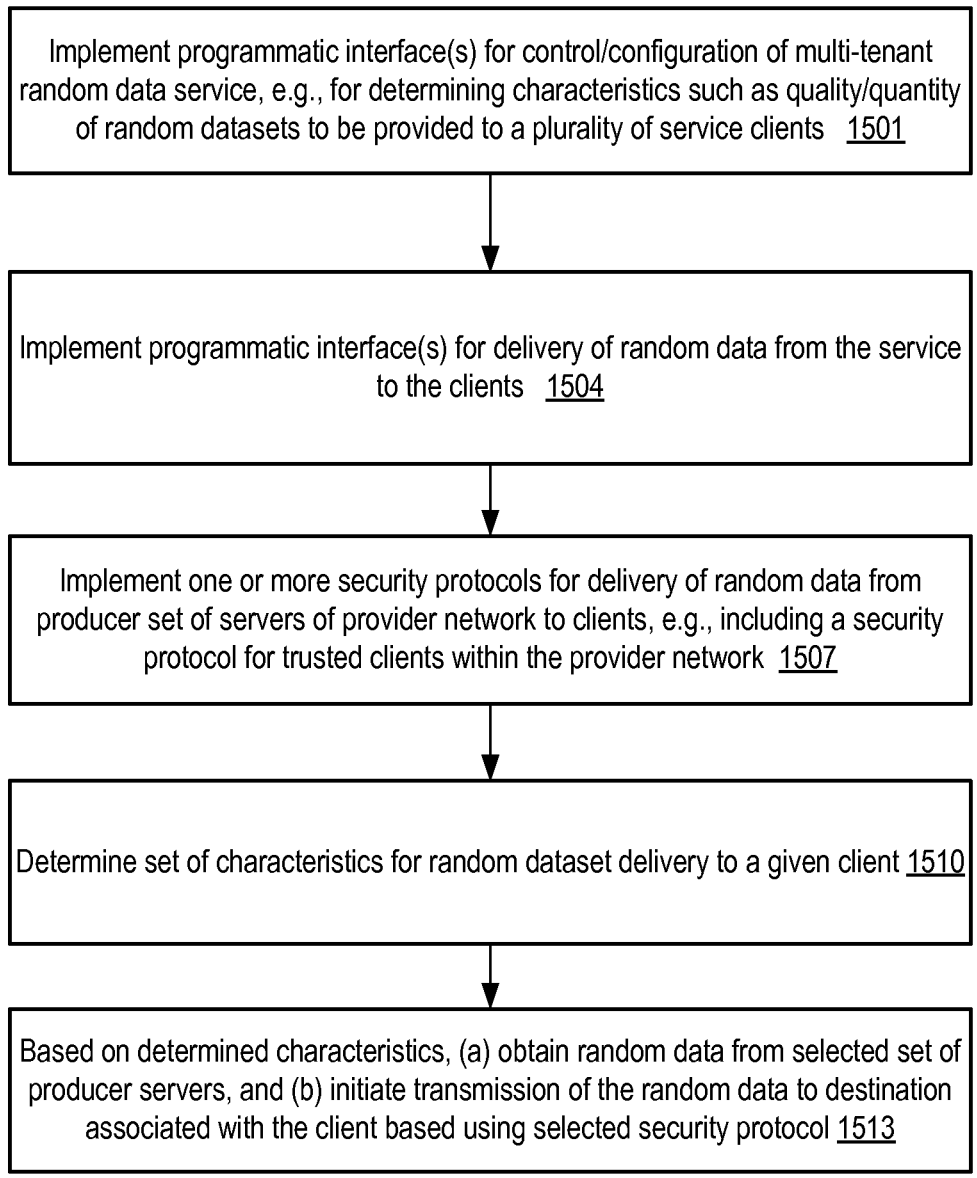
FIG. 15 is a flow diagram illustrating aspects of operations that may be performed to implement a network-accessible service for providing random data via programmatic interfaces, according to at least some embodiments.

FIG. 15 is a flow diagram illustrating aspects of operations that may be performed to implement a network-accessible service for providing random data via programmatic interfaces, according to at least some embodiments. As shown in element 1501, one or more programmatic interfaces (such as APIs, web pages or the like) may be implemented for control and configuration of various aspects of the random data service, such as interfaces allowing clients to specify a desired quality of random data, the types of entropy sources to be used, the quanta or units in which the data is to be transmitted, and so on. Programmatic interfaces may also be implemented for the request and/or delivery of the random data itself, as shown in element 1504. In some embodiments, the same interface may be usable both for specifying/requesting desired random data characteristics, and supplying the random data itself—for example, a consumer application may submit an API request with parameters specifying characteristics of the requested data, and the response to the API request may comprise a set of random data with the desired characteristics.

In at least some embodiments, a plurality of security protocols may be supported for delivery of the random data to clients or consumers, including for example at least one security protocol for use with trusted clients or trusted hosts within the provider network in which the random data service is implemented (element 1507). A different security protocol may be used with untrusted clients or untrusted hosts that may be located outside the provider network, such that neither the untrusted host nor the network path to the untrusted host are under the supervision or control of the operator of the provider network. The protocol used internally within the provider network may be relatively lightweight in some embodiments, with little or no additional security-related processing relative to other internal data transfers. The protocol used with untrusted hosts or consumers may involve additional processing and/or network transfers, such as encryption using client-specified keys, generation of a digest of the random data that is sent to the consumer to allow verification that the random data has not been corrupted or tampered with in transit, and so on. In some embodiments, various aspects of the security policy may be specified by, or on behalf of, the clients (e.g., using one or more of the programmatic interfaces for control or configuration), so that for example appropriate tradeoffs may be made between the level of security or data integrity achieved, and the overhead of providing that level of security or integrity.

The specific set of characteristics of a particular random dataset to be provided to a given client may be determined (element 1510), e.g., based on input received via one of the programmatic interfaces. Random data may be obtained from one or more selected producers of a pool of random data producers of the service in accordance with the determined characteristics, and a transmission of the data to a destination associated with the client may be initiated (element 1513). A security protocol appropriate for the delivery may be used for the transmission.

Figure 16:
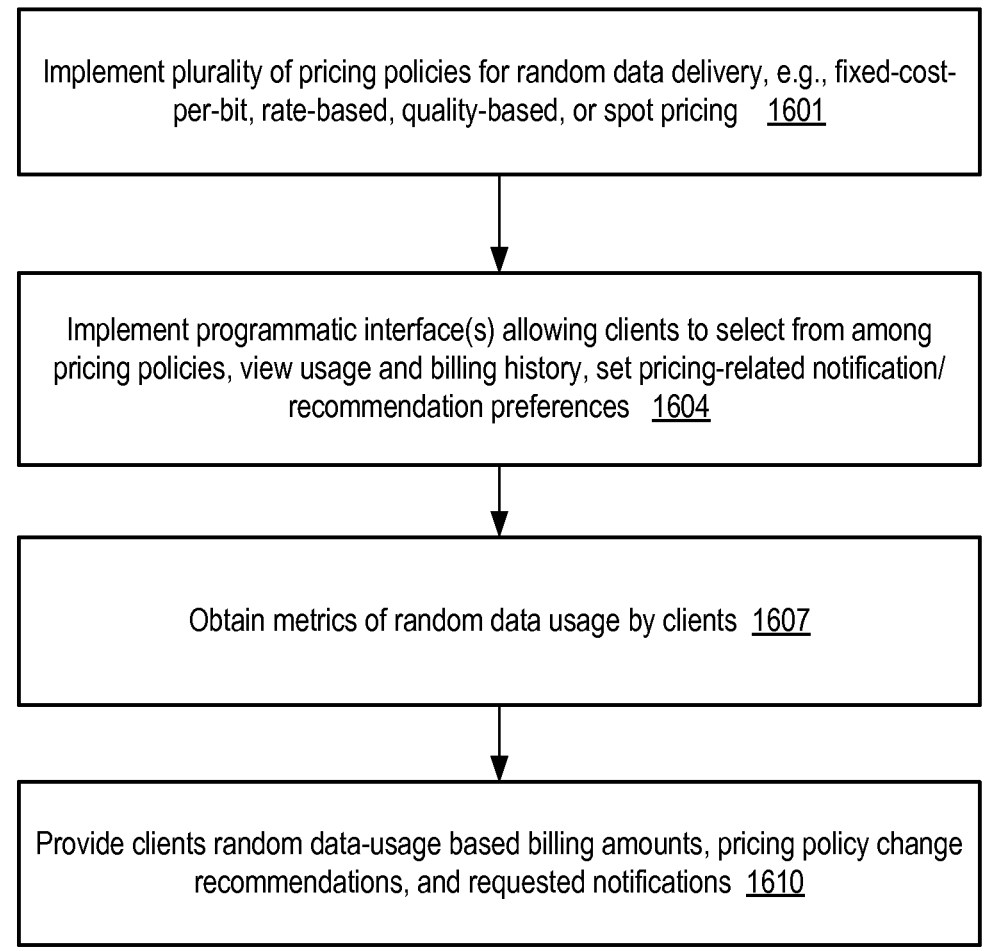
FIG. 16 is a flow diagram illustrating aspects of operations that may be performed to implement selectable pricing policies for a service providing random data, according to at least some embodiments.

FIG. 16 is a flow diagram illustrating aspects of operations that may be performed to implement selectable pricing policies for a service established to provide random data, according to at least some embodiments. As shown in element 1601, a plurality of priding policies may be implemented for random data generation and delivery. Examples pricing approaches may include a fixed price per bit of random data, pricing based on the rate at which random data is provided, quality-based pricing, in which for example the price is a function of the statistical quality of the data (or, as an indirect indicator of quality, on the type and number of entropy sources used), or dynamic pricing based on supply and demand (which may be referred to as spot pricing). In an embodiment in which spot pricing is implemented, for example, the price that a client is to be charged for N bits of random data may vary over time, based on the real-time demand for random data at or near the time when the data is needed, and/or based on the available supply of producers and network paths over which the data is to be transmitted. In some embodiments, clients may be allowed to reserve specified amounts of random data to be provided over a particular time period, e.g., using a reservation-based pricing policy. In one implementation of reserved pricing, clients may be allowed to re-sell random data that they have reserved—e.g., if a determination can be made that the client's applications are not going to use the full amount of random data that has been reserved over X days, the unused reserved random data may be resold, e.g., at a discounted price, using a random data marketplace set up as part of the service. In some embodiments location-dependent pricing policies may be supported, in which for example the cost of providing random data may be based at least in part on the geographical or network location of the destinations associated with the consumers. If random data of a particular quality is only available from a producer located in geographical region X, for example, consumers in region X may be charged less for it than consumers in region Y, because of the additional costs of transmitting the data between regions. A priority-based pricing scheme may be implemented in some embodiments. In one such embodiment, for example, clients who are willing to pay higher rates may be granted higher priority for random data, such that in the event that the producer servers cannot keep up with the random data demands from all customers without delaying the delivery of the data to at least some customers, shorter delays would be experienced by the applications of high-priority clients than by the applications of low-priority clients. Various combinations of the pricing policies described above may be implemented in different embodiments.

Programmatic interfaces associated with pricing and billing for random data may be implemented in the depicted embodiment (element 1604), e.g., to allow users or clients to select desired pricing policies, view billing and/or usage history for their random data, and/or set pricing-related notification preferences (e.g., clients may wish to be notified, using some preferred mechanism such as an email message, if and when their random data related costs reach a threshold, or their consumption of random data exceeds some specified level). The service may obtain and track metrics of random data usage by various clients (element 1610). Billing amounts based on random data usage and the selected pricing policies may be determined and communicated to the clients (element 1613). In addition notifications in accordance with the preferences of the clients may be provided in the depicted embodiment. In some embodiments, the random data service may also be configurable to provide recommendations or suggestions to clients based on client goals (such as preferred budget limits)—for example, the service may recommend the use of lower-cost, lower-quality random data if it appears that providing random data of higher quality is likely to result in budget overruns.

It is noted that in various embodiments, some of the operations shown in the flow diagrams of FIG. 10, 11, 12, 13, 14, 15 or 16 may be omitted or performed in a different order than that shown, or may be performed in parallel rather than serially. It is also noted that the term "application" as used herein may refer to software at any level of a software stack on a computing device, including, but not limited to, components of hypervisors, operating systems, drivers, libraries, user applications, and the like.

Use Cases

The techniques described above, of providing random data sets of configurable quality from a service within a provider network, may be useful in a variety of different scenarios. For example, in environments where virtualized compute services are implemented in the provider network, the random data that can be generated natively (i.e., on the virtualization hosts at which the virtual machines are run) may at least in some cases be of poor quality, or may vary in quality over time (e.g., based on time since virtual machine boot and/or based on time since host boot). Different virtual machines on a given virtualization host may have to share entropy sources in some cases, reducing the statistical independence of the random data provided to each virtual machine. Using a separate pool of servers as random data producers, with high-quality entropy sources accessible from the servers, may be very helpful in enhancing the quality of the random data that is made available on the virtual machines in such environments. In addition, the ability to specify (or exclude) certain types of entropy sources may be beneficial to clients both inside and outside the provider network that wish to have fine-grained control on their random data quality, without having to incur the expense of obtaining and maintaining their own high-quality entropy sources.

By setting up producer pools of the appropriate size to handle system-wide demand, and locating the producers in different availability containers or different data centers, a highly-available mechanism for delivering random data may be established. Consumers both within and outside the provider network may be able to rely on the service to support various types of applications that are dependent on random data, such as cryptographic applications, game applications, and the like, with an assurance that delivery of high-quality random data is unlikely to be interrupted even in the event of failures at one or more data centers. The support for multiple selectable pricing policies may grant users the flexibility they need to meet their random data needs without exceeding their computing budgets. Flexible options for security protocols may help clients balance their needs for data integrity and confidentiality with the overheads associated with higher levels of data security.

Illustrative Computer System

Figure 17:
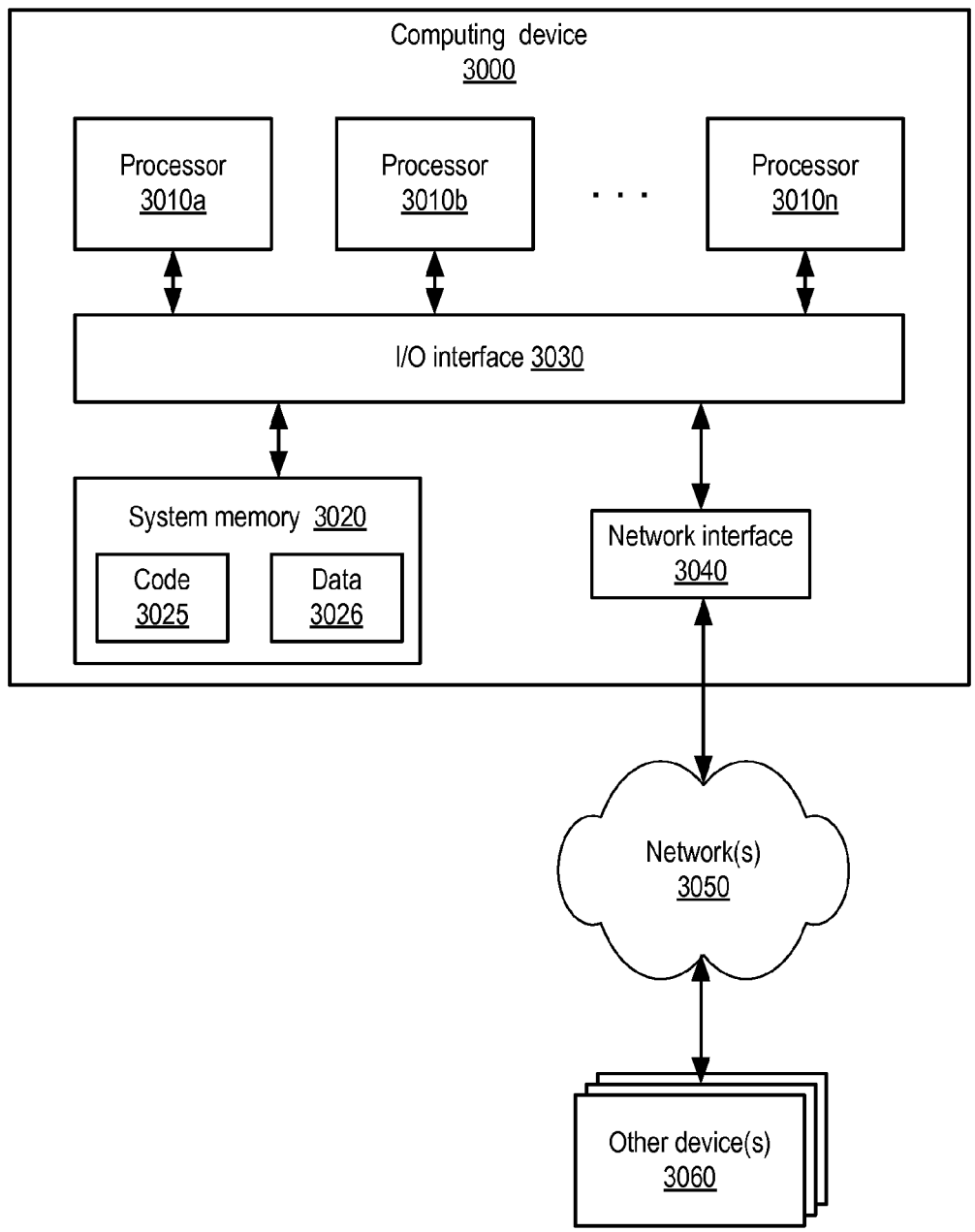
FIG. 17 is a block diagram illustrating an example computing device that may be used in at least some embodiments.

In at least some embodiments, a server that implements a portion or all of one or more of the technologies described herein, including the techniques to implement the various components of a random data service, may include a general-purpose computer system that includes or is configured to access one or more computer-accessible media. FIG. 17 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 16, including various devices serving as entropy sources, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 16 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more hardware processors and memory and configured to:
designate one or more servers of a provider network as members of a pool of producers of random data usable by one or more random data consumers;
determine, for a particular server of the pool, a plurality of candidate entropy sources, wherein the particular server is configurable to generate random data based at least in part on a representation of random phenomena from at least one candidate source of the plurality of candidate entropy sources;
determine (a) a subset of the pool of producers to be used to supply a first collection of random data intended for a first random data consumer and a second collection of random data intended for a second random data consumer, wherein the subset includes the particular server, (b) a first subset and a second subset of the plurality of candidate entropy sources of the particular server to be used to generate the respective first collection of random data for the first random data consumer and the second collection of random data for the second random data consumer, wherein the first subset includes at least one candidate entropy source not included in the second subset based at least on an indication of a desired first level of quality of random data for the first random data consumer that is different than a desired second level of quality of random data for the second random data consumer, and (c) one or more delivery parameters to be used to transmit the respective collections of random data to the first random data consumer and the second random data consumer;
generate the first collection of random data for the first random data consumer using the first subset of candidate entropy sources and the second collection of random data for the second random data consumer using the second subset of candidate entropy sources, wherein the first subset includes the at least one candidate entropy source not included in the second subset based on the indication of the desired first level of quality of random data that is different than the desired second level of quality of random data; and
transmit the respective first collection of random data and the second collection of random data to destinations associated with the first random data consumer and the second random data consumer in accordance with the one or more delivery parameters.

2. The system as recited in claim 1, wherein the one or more computing devices are further configured to add an additional candidate entropy source to the first subset of the plurality of candidate entropy sources based at least in part on an indication of desired statistical properties of the random data for the first random data consumer.

3. The system as recited in claim 1, wherein the first random data consumer comprises a first application executing on a first guest virtual machine of a plurality of guest virtual machines instantiated on a particular host of the provider network, wherein the one or more computing devices are further configured to:
coordinate generation and transmission of respective collections of random data to a plurality of applications running on respective guest virtual machines instantiated on the particular host, including a second application executing on a second guest virtual machine, in accordance with a uniqueness policy indicating a desired level of statistical independence between the collection of random data supplied to the first application and a second collection of random data supplied to the second application.

4. The system as recited in claim 1, wherein the first random data consumer comprises a software component executing on a particular host, wherein the delivery parameters include an indication of a local random data aggregator configured to receive, on the particular host, a portion of the first collection of random data for the first random data consumer, wherein the local random data aggregator is configured to:
combine, in accordance with an aggregation policy, the portion of the first collection of random data with additional random data derived at least in part from a local entropy source associated with the particular host; and
provide, to the random data consumer, a result of a combination of the portion of the first collection of random data and the additional random data.

5. The system as recited in claim 1, wherein the one or more delivery parameters include representations of one or more of: (a) a push policy indicating that one or more collections of random data are to be transmitted on behalf of the first random data consumer in the absence of explicit data requests from the first random data consumer, (b) a pull policy indicating that a portion of the first collection of random data is to be transmitted on behalf of the first random data consumer in response to a data request from the first random data consumer, (c) a security policy to be used to transmit the portion of the first collection of random data in accordance with a set of confidentiality, authenticity, data integrity or replay protection specifications, (d) a size of the portion of the first collection of random data, or (e) a rate at which the portion of the first collection of random data is to be transmitted.

6. A method, comprising:
designating one or more servers of a provider network as members of a pool of producers of random data;
determining, for a particular server of the pool, a first subset and a second subset of a plurality of candidate entropy sources for a respective first random data consumer and a second random data consumer, wherein the first subset includes at least one candidate entropy source not included in the second subset based at least on an indication of a desired first level of quality of random data for the first random data consumer that is different than a desired second level of quality of random data for the second random data consumer, wherein the particular server is configurable to generate the random data for the first and second random data consumers based at least in part on a representation of random phenomena from at least one candidate source of the plurality of candidate entropy sources;

determining a subset of the pool of producers to be used to supply a first collection of random data intended for the first random data consumer and a second collection of random data intended for the second random data consumer, wherein the subset includes the particular server;

generating the first collection of random data for the first random data consumer using the first subset of candidate entropy sources and the second collection of random data for the second random data consumer using the second subset of candidate entropy sources, wherein the first subset includes the at least one candidate entropy source not included in the second subset based on the indication of the desired first level of quality of random data that is different than the desired second level of quality of random data; and transmitting the respective first collection of random data and the second collection of random data directed to destinations associated with the first random data consumer and the second random data consumer.

7. The method as recited in claim 6, further comprising adding an additional candidate entropy source to the first subset to increase a rate at which the particular server is configurable to generate the random data for the first random data consumer.

8. The method as recited in claim 6, wherein the random first data consumer comprises a first application executing on a first guest virtual machine of a plurality of guest virtual machines instantiated on a particular host of the provider network, further comprising:
coordinating generation and transmission of respective collections of random data to a plurality of applications running on respective guest virtual machines instantiated on the particular host, including a second application executing on a second guest virtual machine, in accordance with a uniqueness policy indicating a desired level of statistical independence between the collection of random data supplied to the first application and a second collection of random data supplied to the second application.

9. The method as recited in claim 6, wherein the first random data consumer comprises a software component executing on a particular host, wherein the destination comprises a local random data aggregator configured to receive, on the particular host, a portion of the first collection of random data for the first random data consumer, further comprising:
combining, by the local random data aggregator, the portion of the first collection of random data with a second collection of random data derived at least in part from a local entropy source associated with the particular host; and
providing, by the local random data aggregator to the random data consumer, a result of a combination of the portion of the first collection of random data and the second collection of random data.

10. The method as recited in claim 6, further comprising: determining delivery parameters to be used to transmit a portion of the first collection of random data for the first random data consumer, wherein the delivery parameters include one or more of: (a) a push policy indicating that one or more collections of random data are to be transmitted to a destination of the first random data consumer in the absence of explicit data requests from the first random data consumer, (b) a pull policy indicating that the portion of the first collection of random data is to be transmitted to the destination of the first random data consumer in response to a data request from the first random data consumer, (c) a security policy to be used to transmit the portion of the first collection of random data in accordance with a set of confidentiality, authenticity, data integrity or replay protection specifications, (d) a size of the portion of the first collection of random data, or (e) a rate at which the portion of the first collection of random data is to be transmitted.

11. The method as recited in claim 6, further comprising: determining a rate at which random data is consumed by a plurality of random data consumers; and
determining a number of servers to be included in the pool of producers based at least in part on one or more of (a) the determined rate and (b) an anticipated number of random data consumers.

12. The method as recited in claim 6, wherein the pool of producers comprises a plurality of servers, wherein the provider network comprises a plurality of availability containers, further comprising:
determining availability requirements for the pool of producers of random data; and
generating a placement plan indicating a mapping of the plurality of servers to the plurality of availability containers based at least in part on the availability requirements.

13. The method as recited in claim 6, wherein said determining a subset of the pool of producers to be used to supply the first collection of random data intended for the first random data consumer and the second collection of random data intended for the second random data consumer comprises identifying one or more servers of the pool for inclusion in the subset using a random selection policy.

14. The method as recited in claim 6, further comprising:
determining a different subset of the pool of producers to be used to supply a collection of random data intended for a different random data consumer, wherein the different subset comprises a plurality of servers including an aggregating server;
combining, at the aggregating server, respective collections of random data from one or more servers of the different subset; and
initiating the transmission of a result of the combination of the respective collections of random data to the different random data consumer.

15. The method as recited in claim 6, wherein the first random data consumer comprises an application executing at a computing device external to the provider network, and wherein the transmission of the collection of random data utilizes a network link external to the provider network.

16. The method as recited in claim 6, wherein the first subset of one or more candidate sources includes one or more of: a source of thermal noise, an entity undergoing radioactive decay, a source of electronic noise, a source of shot noise, an entity undergoing detectable quantum-mechanical changes, a clock drift, movement of a disk read/write head, a source of radio noise, weather changes, a sequence of interrupts, a sequence of mouse clicks, or a sequence of keyboard entries.

17. The method as recited in claim 6, wherein the first random data consumer comprises one or more of: a cryptography application, a security certificate generator, a gambling application, an authorization application configured to generate tokens based at least in part on random data, an application configured to use sequence numbers, an entropy extractor configured to generate random numbers from a primary entropy pool at a host of the provider network, a daemon configured to intercept requests for random numbers, an operating system component configured to support a library comprising one or more random number routines, or a virtualization software component configured to provide random data to one or more guest virtual machines.

18. A non-transitory computer-accessible storage medium storing program instructions that when executed on one or more processors:
  designate one or more servers of a provider network as members of a pool of producers of random data usable by one or more random data consumers;
  determine a subset of the pool of producers to be used to supply a first collection of random data intended for a first random data consumer and a second collection of random data intended for a second random data consumer, and a first subset and a second subset of a plurality of candidate entropy sources, to be used to generate the first collection of random data and the second collection of random data for the respective first random data consumer and the second random data consumer, wherein the first subset includes at least one candidate entropy source not included in the second subset based at least on an indication of a desired first level of quality of random data for the first random data consumer that is different than a desired second level of quality of random data for the second random data consumer;
  generate the first collection of random data for the first random data consumer using the first subset of candidate entropy sources and the second collection of random data for the second random data consumer using the second subset of candidate entropy sources, wherein the first subset includes the at least one candidate entropy source not included in the second subset based on the indication of the desired first level of quality of random data that is different than the desired second level of quality of random data; and
  transmit the first collection of random data directed to the first random data consumer and the second collection of random data directed to the second random data consumer.

19. The non-transitory computer-accessible storage medium as recited in claim 18, wherein the instructions when executed on the one or more processors:
  add an additional candidate entropy source to the first subset based at least in part on an indication of a desired level of uniqueness of the random data of the first random data consumer with respect to the random data of the second random data consumer.

20. The non-transitory computer-accessible storage medium as recited in claim 18, wherein the first random data consumer comprises a first application executing on a first guest virtual machine of a plurality of guest virtual machines instantiated on a particular host of the provider network, wherein the instructions when executed on the one or more processors:
  coordinate generation and transmission of respective collections of random data to a plurality of applications running on respective guest virtual machines instantiated on the particular host, including a second application executing on a second guest virtual machine, in accordance with a uniqueness policy indicating a desired level of statistical independence between the collection of random data supplied to the first application and a second collection of random data supplied to the second application.

21. The non-transitory computer-accessible storage medium as recited in claim 18, wherein the first random data consumer comprises a software module executing on a particular host, wherein a destination of the random data for the first random data consumer comprises a local random data aggregator on the particular host, wherein the aggregator is configured to (a) combine a portion of the first collection of random data with additional random data derived at least in part from a local entropy source associated with the particular host, and (b) provide, to the first random data consumer, a result of a combination of the portion of the first collection of random data and the additional random data.

22. The non-transitory computer-accessible storage medium as recited in claim 18, wherein the instructions when executed on the one or more processors:
  determine delivery parameters to be used to transmit a portion of the first collection of random data, wherein the delivery parameters include one or more of: (a) a push policy indicating that one or more collections of random data are to be transmitted to a destination in the absence of explicit data requests from a random data consumer, (b) a pull policy indicating that a portion of the first collection of random data is to be transmitted to a destination in response to a data request from the first random data consumer, (c) a security policy to be used to transmit the first collection of random data in accordance with a set of confidentiality, authenticity, data integrity or replay protection requirements, (d) a size of the first collection of random data, or (e) a rate at which the first collection of random data is to be transmitted.

23. The non-transitory computer-accessible storage medium as recited in claim 18, wherein to determine the subset of the pool of producers to be used to supply the first collection of random data, the instructions when executed in the one or more processors identify one or more servers of the pool for inclusion in the subset using a random selection policy.

24. The non-transitory computer-accessible storage medium as recited in claim 18, wherein the instructions when executed on the one or more processors:
  determine a different subset of the pool of producers to be used to supply a collection of random data intended for a different random data consumer, wherein the different subset comprises a plurality of servers including an aggregating server, wherein the aggregating server is configured to combine respective collections of random data from one or more servers of the different subset; and
  initiate a transmission of a result of the combination of the respective collections of random data to the different random data consumer.

25. A non-transitory computer-accessible storage medium storing program instructions that when executed on one or more processors:
  determine whether a first collection of random data to be provided to a first random data consumer and a second collection of random data to be provided to a second random data consumer are to be generated based at least in part on random data obtained from one or more members of a pool of servers designated as random data producers in a provider network;

in response to a determination that the first collection and the second collection is to be generated based at least in part on the random data obtained from one or more members of the pool of servers, obtain, via a programmatic interface, random data at least in part by a particular member of the pool, wherein a first subset and a second subset of a plurality of candidate entropy sources of the particular member of the pool are used to generate the random data for the respective first random data consumer and the second random data consumer, and wherein the first subset includes at least one candidate entropy source not included in the second subset based at least on an indication of a desired first level of quality of random data for the first random data consumer that is different than a desired second level of quality of random data for the second random data consumer;

determine contents of the first collection of random data and the second collection of random data based at least in part on the random data obtained via the programmatic interface; and provide, to the respective first random data consumer and the second random data consumer, the first collection of random data and the second collection of random data.

26. The non-transitory computer-accessible storage medium as recited in claim 25, wherein the instructions when executed on one or more processors:

determine one or more desired statistical properties of the first collection of random data to be provided to the first random data consumer and the second collection of random data to be provided to the second random data consumer; and determine whether the first collection of random data and the second collection of random data is to be generated based at least in part on random data obtained from one or more members of the pool of servers in accordance with the desired statistical properties.

27. The non-transitory computer-accessible storage medium as recited in claim 25, wherein, to determine the contents of a portion of the collection of random data, the instructions when executed on one or more processors:

combine the random data generated at least in part by a particular member of the pool with random data generated locally at a host on which the first random data consumer executes.

28. The non-transitory computer-accessible storage medium as recited in claim 25, wherein the instructions when executed on one or more processors:

in response to a determination that the first collection of random data to be provided to the first random data consumer is not to be generated based on random data obtained from the pool of servers designated as random data producers in a provider network, provide the first random data consumer with random data generated locally at a host on which the first random data consumer executes.

* * * * *